(12) United States Patent
Carter et al.

(10) Patent No.: US 8,978,586 B1
(45) Date of Patent: Mar. 17, 2015

(54) WILD BIRD FEED DISPENSER WITH SQUIRREL-RESISTANT MECHANISM

(71) Applicant: Classic Brands, LLC, Denver, CO (US)

(72) Inventors: James Carter, Denver, CO (US); Bryan Krueger, Denver, CO (US); Lynn Hunter, Parker, CO (US)

(73) Assignee: Classic Brands, LLC, Denver, CO (US)

( * ) Notice: Subject to any disclaimer, the term of this patent is extended or adjusted under 35 U.S.C. 154(b) by 0 days.

(21) Appl. No.: 13/901,321

(22) Filed: May 23, 2013

Related U.S. Application Data

(60) Provisional application No. 61/650,711, filed on May 23, 2012.

(51) Int. Cl.
*A01K 39/00* (2006.01)
*A01K 5/00* (2006.01)
*A01K 39/01* (2006.01)

(52) U.S. Cl.
CPC ............... *A01K 5/00* (2013.01); *A01K 39/0113* (2013.01)
USPC ........................................ 119/57.9; 119/52.4

(58) Field of Classification Search
CPC ................................................. A01K 39/0113
USPC ............ 119/57.9, 52.2, 52.3, 52.4, 57.8, 429, 119/61.57, 63
See application file for complete search history.

(56) References Cited

U.S. PATENT DOCUMENTS

| | | |
|---|---|---|
| 276,392 A | 4/1883 | Gregory |
| 447,006 A | 2/1891 | Sweeney |
| 771,654 A | 10/1904 | Meek |
| 824,693 A | 6/1906 | Hood |
| 922,720 A | 5/1909 | Peters et al. |
| D63,321 S | 11/1923 | Pirson |
| 1,718,432 A | 6/1929 | Qualmann |
| 1,879,318 A | 9/1932 | Klein |
| D109,128 S | 4/1938 | Copeman |
| D115,321 S | 6/1939 | Pueschel |
| 2,283,373 A | 5/1942 | Krafft |
| 2,531,915 A | 11/1950 | Maly |
| D164,692 S | 10/1951 | Kelly |
| D165,799 S | 1/1952 | Stedman |
| D167,179 S | 7/1952 | Stewart |
| 2,634,705 A | 4/1953 | Mayes |
| D173,658 S | 12/1954 | Jones |
| D174,139 S | 3/1955 | Sadler |

(Continued)

FOREIGN PATENT DOCUMENTS

GB          2269305 A          4/1992

OTHER PUBLICATIONS

U.S. Appl. No. 13/107,841, filed May 13, 2011, Donegan et al.

(Continued)

*Primary Examiner* — Yvonne Abbott-Lewis
(74) *Attorney, Agent, or Firm* — Polsinelli PC

(57) ABSTRACT

A bird feed dispenser for wild birds with squirrel-resistant mechanism that occludes feed ports when a non-bird having a weight sufficient to activate the mechanism engages a portion of the roof or a perch thereon. The dispenser includes at least two feed ports, corresponding perches, and a torsion spring that provide biasing force for the mechanism. The occlusion of feed ports in the dispenser is such that when a non-bird having weight sufficient to activate the mechanism engages a portion of the roof or a perch thereon, all the feed ports are obstructed.

20 Claims, 18 Drawing Sheets

(56) References Cited

U.S. PATENT DOCUMENTS

| | | |
|---|---|---|
| D178,917 S | 10/1956 | England et al. |
| 2,773,474 A | 12/1956 | Nugent |
| D180,686 S | 7/1957 | Everett |
| D185,456 S | 6/1959 | Michalek et al. |
| 2,944,516 A | 7/1960 | Malloy, Sr. |
| 3,022,768 A | 2/1962 | Lynch |
| D193,558 S | 9/1962 | Perry |
| D194,750 S | 3/1963 | Dahmus |
| 3,090,354 A | 5/1963 | Merritt et al. |
| 3,136,296 A | 6/1964 | Luin |
| D199,995 S | 1/1965 | Knodt |
| 3,244,150 A | 4/1966 | Benton |
| D206,975 S | 2/1967 | Dawson |
| D216,002 S | 11/1969 | Stone |
| 3,499,413 A | 3/1970 | Heard |
| D217,470 S | 5/1970 | Morrow |
| 3,693,310 A | 9/1972 | Middleton |
| D235,744 S | 7/1975 | England |
| 3,967,576 A | 7/1976 | Soerensen |
| D241,699 S | 10/1976 | Barecki |
| D244,786 S | 6/1977 | Dryden |
| D244,883 S | 6/1977 | Rohrmuller |
| D249,726 S | 9/1978 | Cosman |
| 4,188,913 A | 2/1980 | Earl et al. |
| 4,194,714 A | 3/1980 | Schultz |
| 4,201,155 A | 5/1980 | Hyde, Jr. |
| D257,179 S | 9/1980 | Campo |
| 4,223,637 A | 9/1980 | Keefe |
| 4,327,669 A | 5/1982 | Blasbalg |
| 4,328,605 A | 5/1982 | Hutchison et al. |
| 4,331,104 A | 5/1982 | Clarke |
| D267,355 S | 12/1982 | Blasbalg |
| D268,362 S | 3/1983 | Wong |
| D274,013 S | 5/1984 | Sun |
| 4,466,376 A | 8/1984 | Wells |
| D276,510 S | 11/1984 | Bent et al. |
| D277,739 S | 2/1985 | Grammas et al. |
| D278,168 S | 3/1985 | Latham et al. |
| D285,840 S | 9/1986 | Poon |
| 4,649,865 A * | 3/1987 | Riggi ........................... 119/57.9 |
| 4,682,461 A | 7/1987 | Sizemore |
| 4,712,512 A | 12/1987 | Schreib et al. |
| 4,738,221 A | 4/1988 | Nock |
| D297,074 S | 8/1988 | Burke et al. |
| D299,770 S | 2/1989 | Coffer |
| D300,882 S | 5/1989 | Olson |
| 4,896,628 A | 1/1990 | Kadunce |
| D313,169 S | 12/1990 | Scott et al. |
| 4,989,548 A | 2/1991 | Short et al. |
| 4,996,947 A | 3/1991 | Petrides |
| 5,033,411 A | 7/1991 | Brucker |
| D324,436 S | 3/1992 | Embree |
| 5,094,417 A | 3/1992 | Creed |
| 5,105,765 A | 4/1992 | Loken |
| D326,003 S | 5/1992 | Embree |
| D326,286 S | 5/1992 | Kerivan |
| 5,115,343 A | 5/1992 | Bennett |
| D334,133 S | 3/1993 | Hartzheim |
| 5,191,857 A | 3/1993 | Boaz |
| D335,006 S | 4/1993 | Blasbalg |
| 5,255,631 A | 10/1993 | Anderson |
| 5,265,557 A | 11/1993 | Lovitz |
| 5,289,796 A | 3/1994 | Armstrong |
| 5,291,855 A | 3/1994 | Laverty |
| D349,981 S | 8/1994 | Fasino |
| D352,575 S | 11/1994 | Bransky et al. |
| D352,787 S | 11/1994 | Hulse |
| D354,079 S | 1/1995 | Shapiro |
| D365,893 S | 1/1996 | Thorp |
| 5,490,480 A | 2/1996 | Dumond |
| D370,313 S | 5/1996 | Nottingham et al. |
| D370,315 S | 5/1996 | Miller |
| D371,226 S | 6/1996 | Lee |
| D371,227 S | 6/1996 | Lee |
| D371,230 S | 6/1996 | Nottingham et al. |
| D376,731 S | 12/1996 | Lin |
| D380,066 S | 6/1997 | Green et al. |
| D384,443 S | 9/1997 | Olfert |
| D384,505 S | 10/1997 | Stewart |
| 5,676,089 A * | 10/1997 | Morganson ................. 119/52.3 |
| D386,834 S | 11/1997 | Nissim et al. |
| D386,835 S | 11/1997 | Passamare |
| D386,836 S | 11/1997 | Hunt |
| D388,312 S | 12/1997 | Sorkin |
| 5,701,841 A | 12/1997 | Fasino |
| D390,490 S | 2/1998 | Ruderick |
| 5,729,949 A | 3/1998 | Hartzheim |
| 5,782,200 A | 7/1998 | Knowles et al. |
| D397,529 S | 8/1998 | Fuller et al. |
| D399,611 S | 10/1998 | Ericson et al. |
| 5,947,054 A * | 9/1999 | Liethen ....................... 119/57.9 |
| D414,901 S | 10/1999 | Cirelli |
| D420,176 S | 2/2000 | Heinzeroth |
| D421,709 S | 3/2000 | Haslem et al. |
| 6,073,581 A | 6/2000 | Wang |
| D428,437 S | 7/2000 | Hmelar et al. |
| 6,095,087 A | 8/2000 | Bloedorn |
| 6,119,627 A | 9/2000 | Banyas et al. |
| D431,760 S | 10/2000 | Sullivan |
| D435,666 S | 12/2000 | Barsomian |
| D440,361 S | 4/2001 | Colwell |
| 6,213,054 B1 | 4/2001 | Marshall |
| 6,253,707 B1 | 7/2001 | Cote |
| 6,305,321 B1 | 10/2001 | Potente |
| D451,251 S | 11/2001 | Chrisco et al. |
| D452,929 S | 1/2002 | Perelli |
| 6,360,690 B1 | 3/2002 | Canby |
| 6,408,788 B1 | 6/2002 | Lieb et al. |
| D459,840 S | 7/2002 | Lian |
| 6,415,737 B2 | 7/2002 | Banyas et al. |
| 6,427,629 B1 | 8/2002 | Lush |
| D462,172 S | 9/2002 | Aurelio, Jr. |
| D462,286 S | 9/2002 | Perelli |
| 6,450,120 B1 | 9/2002 | Nylen |
| 6,457,439 B1 | 10/2002 | Engelking |
| D466,255 S | 11/2002 | Kuelbs |
| D466,656 S | 12/2002 | Kuelbs et al. |
| D467,513 S | 12/2002 | Neff |
| D468,368 S | 1/2003 | Jones |
| D470,630 S | 2/2003 | Kuelbs |
| D471,327 S | 3/2003 | Kuelbs |
| D472,490 S | 4/2003 | Perelli |
| 6,543,383 B1 | 4/2003 | Cote |
| 6,543,384 B2 | 4/2003 | Cote |
| 6,546,894 B2 | 4/2003 | Chrisco et al. |
| D475,128 S | 5/2003 | Svendsen et al. |
| 6,571,742 B1 | 6/2003 | Tsengas |
| 6,622,654 B2 | 9/2003 | Fasino |
| D480,291 S | 10/2003 | Sorkin |
| D482,262 S | 11/2003 | Sorkin |
| 6,701,867 B1 | 3/2004 | Garrison |
| D490,576 S | 5/2004 | Rich et al. |
| D491,443 S | 6/2004 | Lowery |
| D495,900 S | 9/2004 | Mayse |
| D497,458 S | 10/2004 | Nauert |
| D499,515 S | 12/2004 | Schulze et al. |
| D500,243 S | 12/2004 | Turek |
| D500,668 S | 1/2005 | Kelly et al. |
| D503,019 S | 3/2005 | Swift et al. |
| 6,863,024 B1 | 3/2005 | Obenshain |
| 6,866,004 B1 | 3/2005 | Lush |
| D504,746 S | 5/2005 | Lee |
| D505,755 S | 5/2005 | Lundstrom et al. |
| 6,895,894 B2 | 5/2005 | Fort, II |
| D509,325 S | 9/2005 | Jung et al. |
| 6,945,192 B2 | 9/2005 | Cote |
| D512,661 S | 12/2005 | Morris et al. |
| D512,800 S | 12/2005 | Jung et al. |
| 6,986,322 B2 | 1/2006 | Lumpkin et al. |
| D514,319 S | 2/2006 | King et al. |
| D515,748 S | 2/2006 | Jung et al. |
| D516,413 S | 3/2006 | Anderson et al. |
| 7,021,241 B2 | 4/2006 | Nock |
| 7,032,538 B1 | 4/2006 | Lush |

(56) References Cited

U.S. PATENT DOCUMENTS

| | | | |
|---|---|---|---|
| 7,032,539 | B1 | 4/2006 | Obenshain |
| D522,180 | S | 5/2006 | Goria, II |
| D524,490 | S | 7/2006 | Obenshain |
| 7,086,352 | B2 | 8/2006 | Goodger |
| 7,096,821 | B2 | 8/2006 | Ruff |
| D535,445 | S | 1/2007 | Obenshain |
| 7,185,605 | B1 | 3/2007 | Lush |
| 7,191,731 | B2 | 3/2007 | Cote |
| D542,982 | S | 5/2007 | Wendell |
| D543,256 | S | 5/2007 | Chen |
| 7,258,075 | B1 | 8/2007 | Jones et al. |
| 7,261,056 | B2 | 8/2007 | Hunter et al. |
| D551,952 | S | 10/2007 | Palmer |
| 7,278,613 | B2 | 10/2007 | Roy |
| 7,287,486 | B2 | 10/2007 | Hunter |
| D557,595 | S | 12/2007 | Ernst et al. |
| 7,302,911 | B1 | 12/2007 | Lush |
| D558,567 | S | 1/2008 | Ismert |
| D561,040 | S | 2/2008 | Sequeira |
| 7,347,162 | B2 * | 3/2008 | Zieff et al. ............ 119/52.3 |
| D567,098 | S | 4/2008 | Sequeira |
| D568,754 | S | 5/2008 | Sequeira |
| 7,370,607 | B2 | 5/2008 | O'Dell |
| 7,373,901 | B2 | 5/2008 | Baynard |
| D575,118 | S | 8/2008 | Bignon |
| D575,591 | S | 8/2008 | Bonetti |
| 7,409,922 | B1 | 8/2008 | Baynard et al. |
| D578,379 | S | 10/2008 | Sorkin |
| D578,870 | S | 10/2008 | Sorkin |
| D581,183 | S | 11/2008 | Kutscha et al. |
| D581,259 | S | 11/2008 | Portz |
| 7,448,346 | B1 * | 11/2008 | Stone et al. ............ 119/52.3 |
| 7,451,580 | B2 | 11/2008 | Kelly et al. |
| 7,469,656 | B2 | 12/2008 | Hunter et al. |
| 7,484,475 | B2 | 2/2009 | Milliner |
| 7,503,282 | B1 | 3/2009 | Lush |
| 7,506,611 | B1 | 3/2009 | Lush |
| D590,541 | S | 4/2009 | Chaoui |
| 7,516,716 | B2 | 4/2009 | Puckett et al. |
| D592,362 | S | 5/2009 | Rutherford et al. |
| D594,737 | S | 6/2009 | Kelly et al. |
| 7,549,394 | B2 | 6/2009 | Nock |
| D600,099 | S | 9/2009 | Dahlin |
| D606,708 | S | 12/2009 | McMullen |
| D607,612 | S | 1/2010 | Yang |
| D609,064 | S | 2/2010 | Najaryan et al. |
| D609,864 | S | 2/2010 | Tsai |
| 7,654,225 | B2 | 2/2010 | Madsen et al. |
| D612,108 | S | 3/2010 | Torres et al. |
| D612,730 | S | 3/2010 | Rushe |
| D614,019 | S | 4/2010 | Goodman et al. |
| D616,040 | S | 5/2010 | Spencer |
| D616,288 | S | 5/2010 | Simon et al. |
| 7,721,677 | B1 | 5/2010 | McClaskey |
| 7,739,982 | B2 | 6/2010 | Cote |
| D620,074 | S | 7/2010 | Muhlenbruck |
| D621,241 | S | 8/2010 | Mirer et al. |
| D621,268 | S | 8/2010 | Morabito |
| D622,910 | S | 8/2010 | Puckett |
| D632,952 | S | 2/2011 | Dablemont |
| D635,844 | S | 4/2011 | Boothby |
| 7,926,450 | B1 | 4/2011 | Tsengas |
| D638,501 | S | 5/2011 | Fishman |
| D644,090 | S | 8/2011 | Sittig |
| 8,028,490 | B2 | 10/2011 | Kelly et al. |
| D649,299 | S | 11/2011 | Lush |
| D649,302 | S | 11/2011 | Hickok |
| D650,261 | S | 12/2011 | McDuff et al. |
| 8,070,380 | B2 | 12/2011 | Pucillo et al. |
| D656,690 | S | 3/2012 | Tu |
| D661,573 | S | 6/2012 | Paik et al. |
| D664,307 | S | 7/2012 | Krueger et al. |
| D664,437 | S | 7/2012 | Barel |
| 8,230,809 | B2 | 7/2012 | Cote |
| D667,294 | S | 9/2012 | Wang |
| 8,272,607 | B2 | 9/2012 | Bonnema |
| D671,692 | S | 11/2012 | Carter |
| D677,016 | S | 2/2013 | Carter |
| D678,625 | S | 3/2013 | Carter et al. |
| D678,626 | S | 3/2013 | Krueger |
| D678,627 | S | 3/2013 | Carter |
| D679,059 | S | 3/2013 | Carter |
| D679,453 | S | 4/2013 | Krueger et al. |
| 2003/0033985 | A1 | 2/2003 | Hardison |
| 2003/0136347 | A1 | 7/2003 | Fasino |
| 2003/0150390 | A1 | 8/2003 | Rich et al. |
| 2003/0226514 | A1 | 12/2003 | Cote |
| 2004/0098942 | A1 | 5/2004 | Lee et al. |
| 2004/0216684 | A1 | 11/2004 | Obenshain |
| 2004/0231606 | A1 | 11/2004 | Nock |
| 2004/0250777 | A1 | 12/2004 | Stachowiak |
| 2005/0120967 | A1 | 6/2005 | Ruff |
| 2005/0120972 | A1 | 6/2005 | Aboujaoude et al. |
| 2005/0263085 | A1 | 12/2005 | Rich |
| 2005/0268862 | A1 | 12/2005 | Morrison |
| 2006/0225658 | A1 | 10/2006 | Baynard |
| 2006/0249096 | A1 | 11/2006 | Gick |
| 2006/0266295 | A1 | 11/2006 | McDarren |
| 2006/0272585 | A1 | 12/2006 | O'Dell |
| 2006/0288532 | A1 | 12/2006 | Kim |
| 2007/0034160 | A1 | 2/2007 | Nock |
| 2007/0163506 | A1 | 7/2007 | Bloedorn |
| 2007/0227453 | A1 | 10/2007 | Puckett et al. |
| 2007/0227454 | A1 | 10/2007 | Fahey |
| 2007/0266951 | A1 | 11/2007 | Berns |
| 2008/0022936 | A1 | 1/2008 | Stone et al. |
| 2008/0078329 | A1 | 4/2008 | Hunter et al. |
| 2008/0105206 | A1 | 5/2008 | Rich et al. |
| 2008/0134979 | A1 | 6/2008 | Crocker |
| 2008/0276874 | A1 | 11/2008 | Evans |
| 2009/0020075 | A1 | 1/2009 | Wood et al. |
| 2009/0071408 | A1 | 3/2009 | Wechsler |
| 2009/0223456 | A1 | 9/2009 | Hunter et al. |
| 2009/0260576 | A1 | 10/2009 | Vosbikian |
| 2009/0283046 | A1 | 11/2009 | Black |
| 2009/0304900 | A1 | 12/2009 | Augustin |
| 2009/0314221 | A1 | 12/2009 | Wang |
| 2010/0061091 | A1 | 3/2010 | Galipeau et al. |
| 2010/0089330 | A1 | 4/2010 | McMullen |
| 2010/0288200 | A1 | 11/2010 | Lush |
| 2010/0300363 | A1 | 12/2010 | Nangia |
| 2011/0083609 | A1 | 4/2011 | Cote |
| 2011/0088626 | A1 | 4/2011 | Hepp et al. |
| 2011/0180004 | A1 | 7/2011 | Humphries et al. |
| 2011/0214616 | A1 | 9/2011 | Levin et al. |
| 2011/0226186 | A1 | 9/2011 | Hunter et al. |
| 2012/0037080 | A1 | 2/2012 | Hepp et al. |
| 2012/0055410 | A1 | 3/2012 | Cote |
| 2012/0234249 | A1 | 9/2012 | Gaze |

OTHER PUBLICATIONS

U.S. Appl. No. 13/420,086, filed Mar. 14, 2012, Carter et al.
U.S. Appl. No. 13/420,063, filed Mar. 14, 2012, Carter et al.
U.S. Appl. No. 29/427,461, filed Jul. 18, 2012, Krueger et al.
U.S. Appl. No. 29/448,176, filed Mar. 11, 2013, Carter.
U.S. Appl. No. 13/855,523, filed Apr. 2, 2013, Donegan et al.
U.S. Appl. No. 13/855,565, filed Apr. 2, 2013, Donegan et al.
Ex Parte Quayle Action, Design U.S. Appl. No. 29/390,071, mailed Dec. 20, 2011, 4 pages.
Notice of Allowance, Design U.S. Appl. No. 29/390,071, mailed Mar. 26, 2012, 7 pages.
Response to Ex Parte Quayle Action, Design U.S. Appl. No. 29/390,071, filed Mar. 19, 2012, 20 pages.
Response to Restriction Requirement, Design U.S. Appl. No. 29/390,071, filed Dec. 12, 2011, 2 pages.
Restriction Requirement, Design U.S. Appl. No. 29/390,071, mailed Oct. 11, 2011, 4 pages.
Non-Final Office Action, U.S. Appl. No. 13/107,841, mailed Jun. 27, 2012, 9 pages.
Notice of Allowance, Design U.S. Appl. No. 29/427,461, mailed Oct. 4, 2012, 15 pages.

(56) References Cited

OTHER PUBLICATIONS

Response to Non-Final Office Action, U.S. Appl. No. 13/107,841, filed Nov. 27, 2012, 21 pages.
Final Office Action, U.S. Appl. No. 13/107,841, mailed Jan. 9, 2013, 22 pages.
Response to Final Office Action, U.S. Appl. No. 13/107,841, filed Jul. 8, 2013, 10 pages.
Restriction Requirement, Design U.S. Appl. No. 29/387,519, mailed Jun. 13, 2012, 4 pages.
Notice of Allowance, Design U.S. Appl. No. 29/387,520, mailed Jun. 15, 2012, 10 pages.
Ex Parte Quayle Action, Design U.S. Appl. No. 29/387,515, mailed Jun. 20, 2012, 5 pages.
Response to Restriction Requirement, Design U.S. Appl. No. 29/387,519, filed Jul. 5, 2012, 2 pages.
Non-Final Office Action, U.S. Appl. No. 29/387,516, mailed Jul. 6, 2012, 7 pages.
Response to Ex Parte Quayle Action, U.S. Appl. No. 29/387,515, filed Aug. 20, 2012, 7 pages.
Final Quayle Action, Design U.S. Appl. No. 29/387,515, mailed Aug. 28, 2012, 5 pages.
Notice of Allowance, Design U.S. Appl. No. 29/387,519, mailed Sep. 13, 2012, 11 pages.
Response to Non-Final Office Action, Design U.S. Appl. No. 29/387,516, filed Nov. 6, 2012, 10 pages.
Response to Final Office Action, Design U.S. Appl. No. 29/387,515, filed Nov. 19, 2012, 4 pages.
Notice of Allowance, U.S. Appl. No. 29/387,516, mailed Nov. 13, 2012, 11 pages.
Notice of Allowance, U.S. Appl. No. 29/387,518, mailed Dec. 21, 2012, 24 pages.
Notice of Allowance, U.S. Appl. No. 29/387,515, mailed Dec. 18, 2012, 14 pages.
Notice of Allowance, U.S. Appl. No. 29/387,520, mailed Dec. 21, 2012, 8 pages.
Notice of Allowance, U.S. Appl. No. 29/416,887, mailed Dec. 26, 2012, 15 pages.
Notice of Allowance, U.S. Appl. No. 29/416,886, mailed Jan. 10, 2013, 15 pages.
Non-Final Office Action, U.S. Appl. No. 13/107,841, filed mailed Aug. 19, 2013, 20 pages.
Response to Non-Final Office Action, U.S. Appl. No. 13/107,841, filed Jan. 22, 2014, 12 pages.
Non-Final Office Action, U.S. Appl. No. 13/855,565, mailed Sep. 27, 2013, 32 pages.
Response to Non-Final Office Action, U.S. Appl. No. 13/855,565, filed Jan. 27, 2014, 6 pages.
Non-Final Office Action, U.S. Appl. No. 13/855,523, mailed Sep. 30, 2013, 29 pages.
Response to Non-Final Office Action, U.S. Appl. No. 13/855,523, filed Jan. 27, 2014, 6 pages.
Non-Final Office Action, U.S. Appl. No. 13/420,086, mailed Oct. 7, 2013, 23 pages.
Response to Non-Final Office Action, U.S. Appl. No. 13/420,086, filed Apr. 7, 2014, 16 pages.
Non-Final Office Action, U.S. Appl. No. 13/420,063, mailed Apr. 10, 2014, 10 pages.
Notice of Allowance, U.S. Appl. No. 13/855,523; mailed May 14, 2014, 10 pages.
Notice of Allowance, U.S. Appl. No. 13/855,565; mailed May 13, 2014, 10 pages.
Notice of Allowance, U.S. Appl. No. 13/107,841; mailed Jun. 12, 2014, 18 pages.
Response to Non-Final Office Action, U.S. Appl. No. 13/420,063, filed Sep. 10, 2014, 9 pages.
U.S. Appl. No. 14/486,795, filed Sep. 15, 2014, Donegan et al.
U.S. Appl. No. 14/486,904, filed Sep. 15, 2014, Donegan et al.

* cited by examiner

WILD BIRD FEED DISPENSER WITH SQUIRREL-RESISTANT MECHANISM

CROSS-REFERENCE TO RELATED APPLICATIONS

The present application claims priority under 35 U.S.C. §119 to U.S. provisional patent application 61/650,711, which was filed May 23, 2012, entitled "WILD BIRD FEED DISPENSER WITH SQUIRREL-RESISTANT MECHANISM," and is hereby incorporated by reference in its entirety into the present application.

TECHNICAL FIELD

Aspects of the presently disclosed technology relate to wild bird feed dispensers. In particular, the technology relates to wild bird feed dispensers that include mechanisms that resist non-birds from accessing the feed in the dispenser.

BACKGROUND

Attracting wild birds by feeding birdseed is a very popular hobby. Usually, persons who wish to attract wild birds, specifically song birds, with feed do not wish to also attract non-bird species, specifically squirrels. Squirrels enjoy eating birdseed and can discourage wild birds from visiting the birdfeeder device, especially when the squirrels are likely to consume most of the birdseed. This can be expensive as well, since feeding squirrels and such non-bird species as well as wild birds can be quite burdensome. There are many mechanisms and strategies to deny squirrels and the like access to the bird seed in a bird feeder. Most such mechanisms, as here, rely on the substantial difference between the weight of a typical squirrel and that of a desirable song bird.

SUMMARY

Disclosed is a feeder for dispensing birdfeed to wild birds but resists dispensing that birdseed to non-birds. These feeders have a hanger for suspending the bird feeder from a support, and a housing having a generally vertically extending wall. This wall defines a feed reservoir for a supply of the birdseed to be dispensed. The housing wall has at least two feeding ports formed through the wall. The housing also defines an upwardly facing opening into the feed reservoir, primarily for filling the feed reservoir with birdfeed, preferably birdseed. The feeder also has a roof assembly which removably covers the upwardly facing opening into the feed reservoir. This roof assembly is mounted for movement relative to the housing. There is a perch at each of the at least two feeding ports. This perch is mounted for movement relative to its adjacent port. There is a mechanical link attached to the perch and extending to and linking the roof assembly, whereby movement of the roof assembly relative to the housing causes to perch to move relative to its adjacent port. The roof assembly includes at least one opening sized to permit the hanger to pass through the roof whereby the hanger attaches to and suspends the housing and whereby movement of the perch or movement of the roof assembly relative to the housing is permitted even when the feeder is suspended by this hanger. There is at least one torsion spring for biasing the perch into a first position relative to its adjacent port. This torsion spring permits the perch to move to a second position when a non-bird moves either the roof assembly or the perch downwardly against the bias of this torsion spring. The link preferably extends generally vertically from the perch upwardly to engage a portion of the roof assembly that extends outwardly from and beyond the wall of the housing. This mechanical link most preferably has an aperture aligned with a feed port at least in one of the spring biased positions of the perch.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modification in various aspects, all without departing from the spirit and scope of the presently disclosed technology. Accordingly, the drawings and detailed description are to be regarded as illustrative in nature and not limiting.

DETAILED DESCRIPTION

Figure 1:
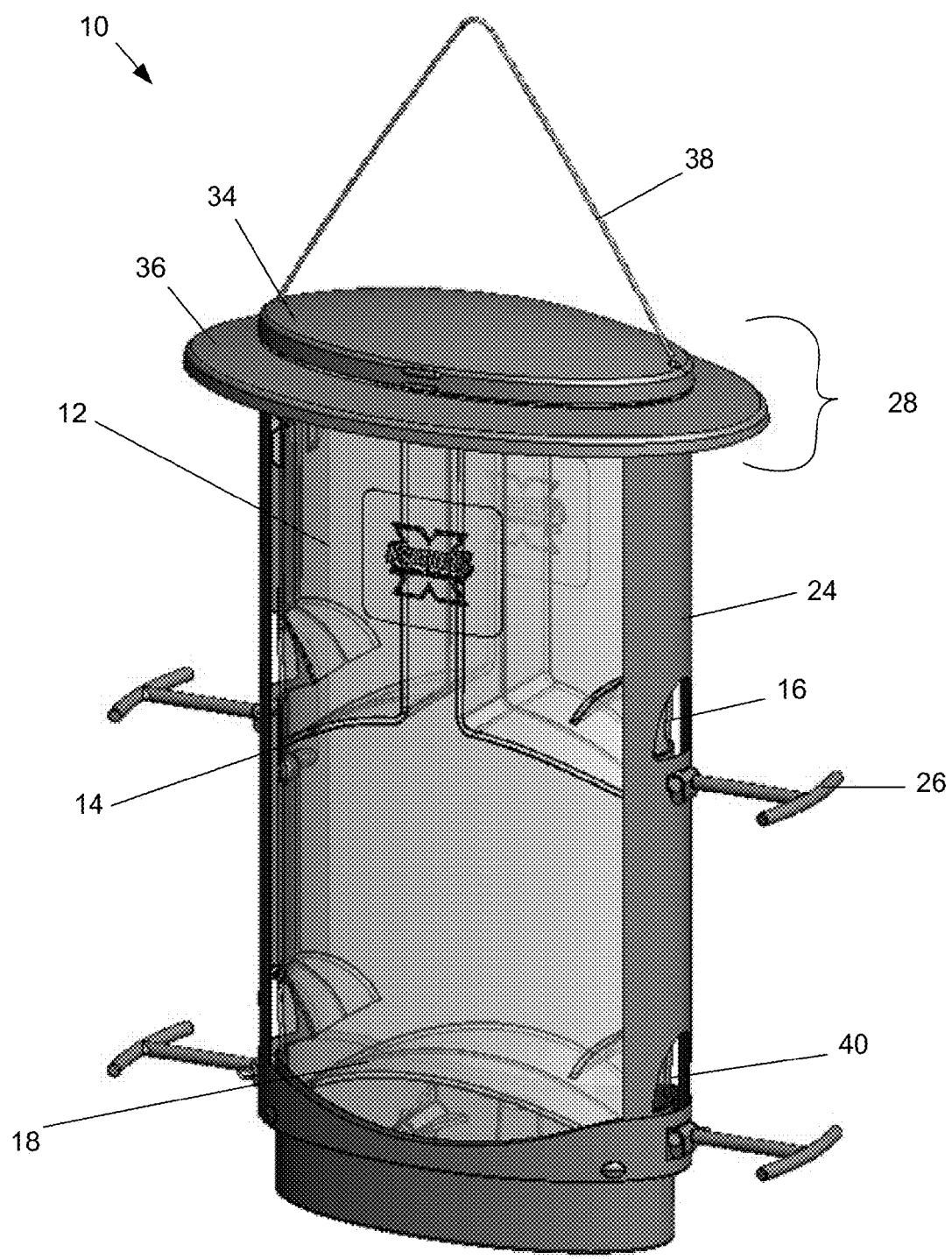
FIG. 1 is a perspective view of one embodiment.
Figure 2:
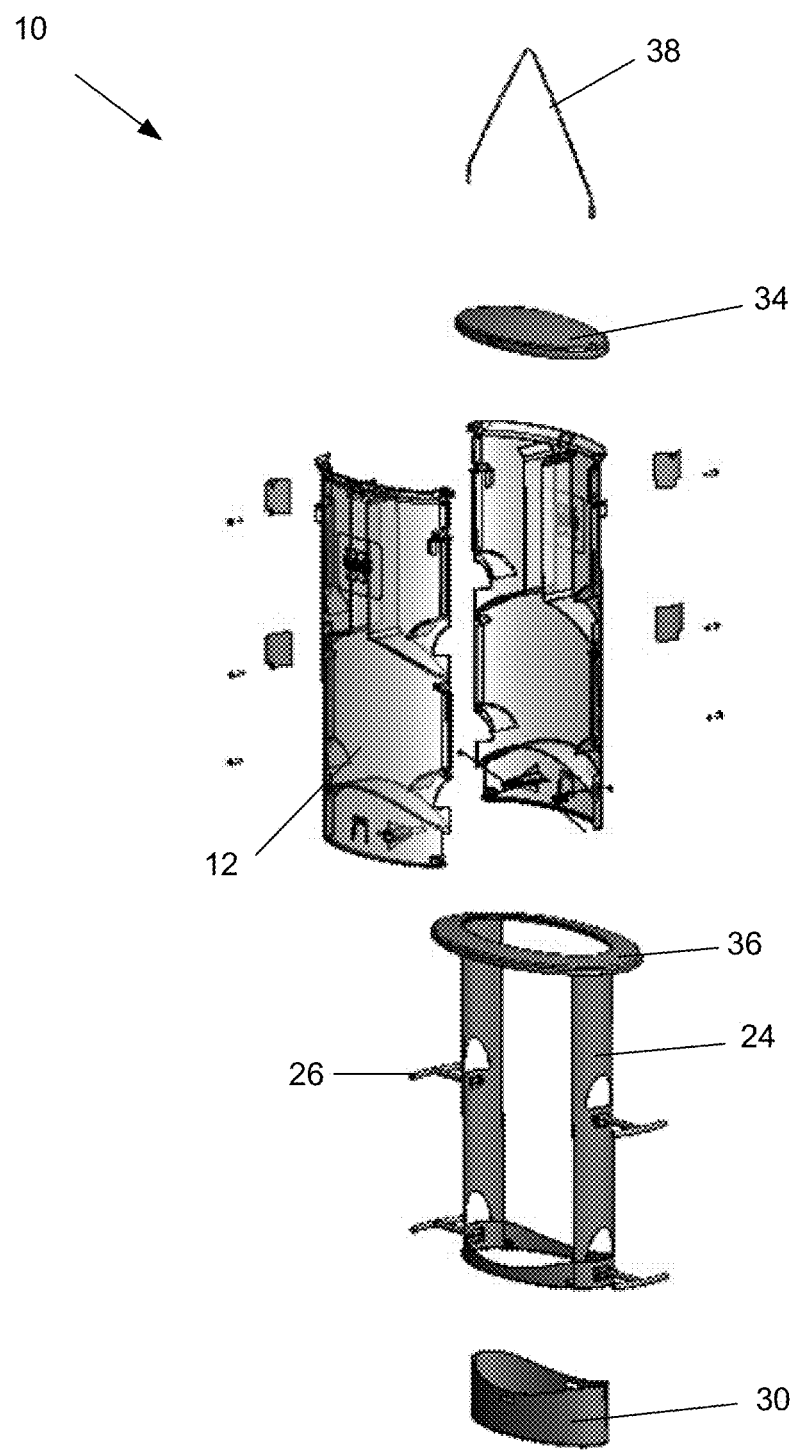
FIG. 2 is an exploded view showing the main parts of the first embodiment.
Figure 4:
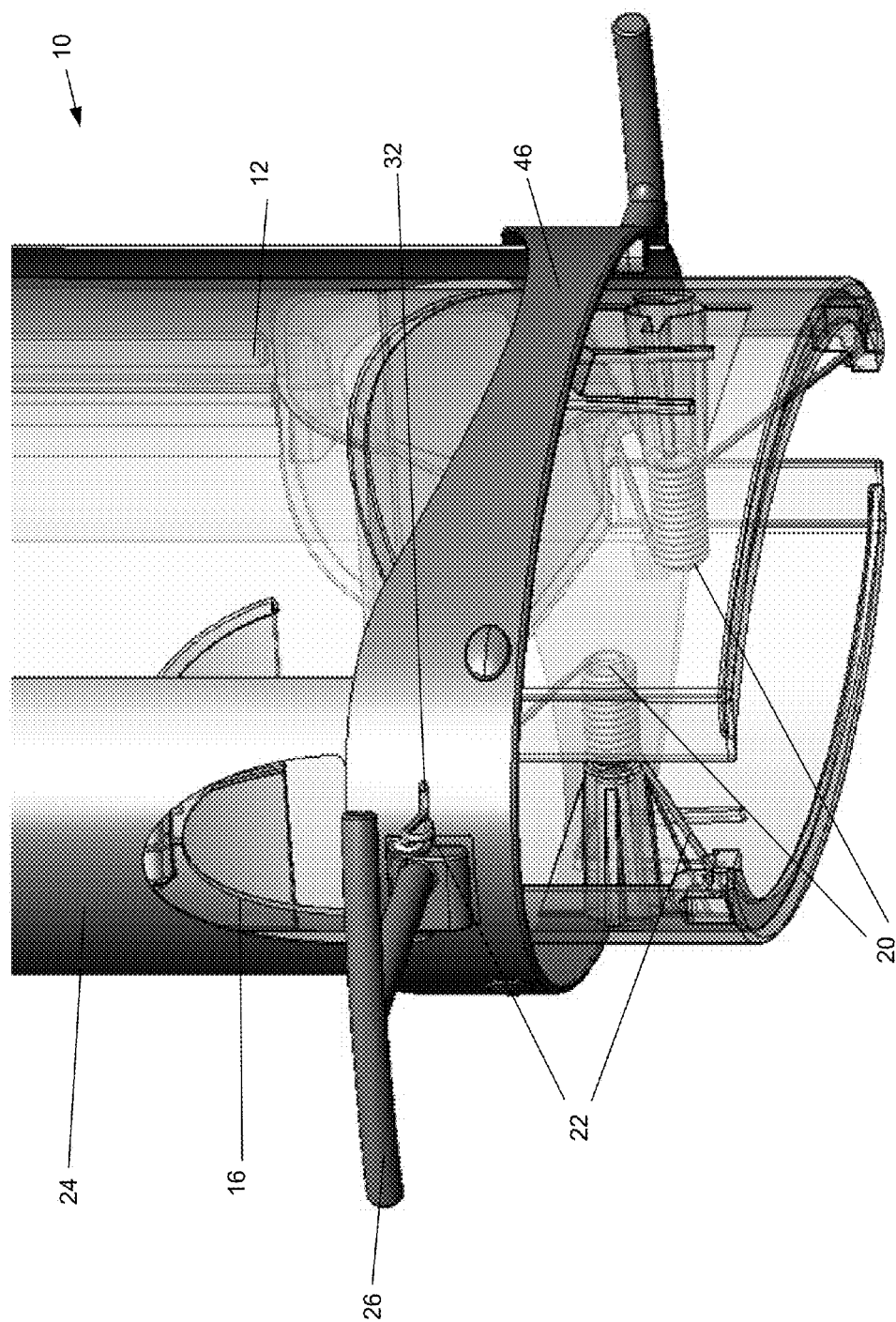
FIG. 4 is a view similar to FIG. 3 with a base portion removed to show torsion springs.

Referring to the various figures, the birdfeeder assembly 10 comprises two generally vertically symmetrical housing halves of injection molded preferably transparent or translucent polymer. These two housing halves may be held together by glue or screws or may be assembled using clips and hinging mechanisms so that the housing 12 can be easily cleaned after being used to feed birds. The housing 12 preferably includes internal baffles 14 to help distribute the seed that is poured into the top upwardly facing opening towards various feed ports 16. The feed ports 16 are thus molded-in passages through the housing 12 wall from the outside of the housing 10 to the interior where the bird seed is held within the housing 12 reservoir. Referring to the embodiment of FIG. 1, the housing 12 includes four feed ports 16, two on each diametrically opposite side. Each pair of feed ports 16 is arranged one vertically above the other. The bottom of the feed reservoir is defined by a pair of generally curving walls 18 that engage along adjacent edges or surfaces to define a generally solid bottom which slopes to the bottom-most pair of feed ports 16. As seen in FIG. 4, below this bottom surface the housing 12 walls continue and support and define a pair of studs 20 about which a pair of torsion springs 22 are mounted. As will be detailed, these torsion springs 22 engage a pair of actuators 24 or linkages which mechanically interconnect all of the perches 26 as well as at least a portion of the roof assembly 28.

Figure 3:
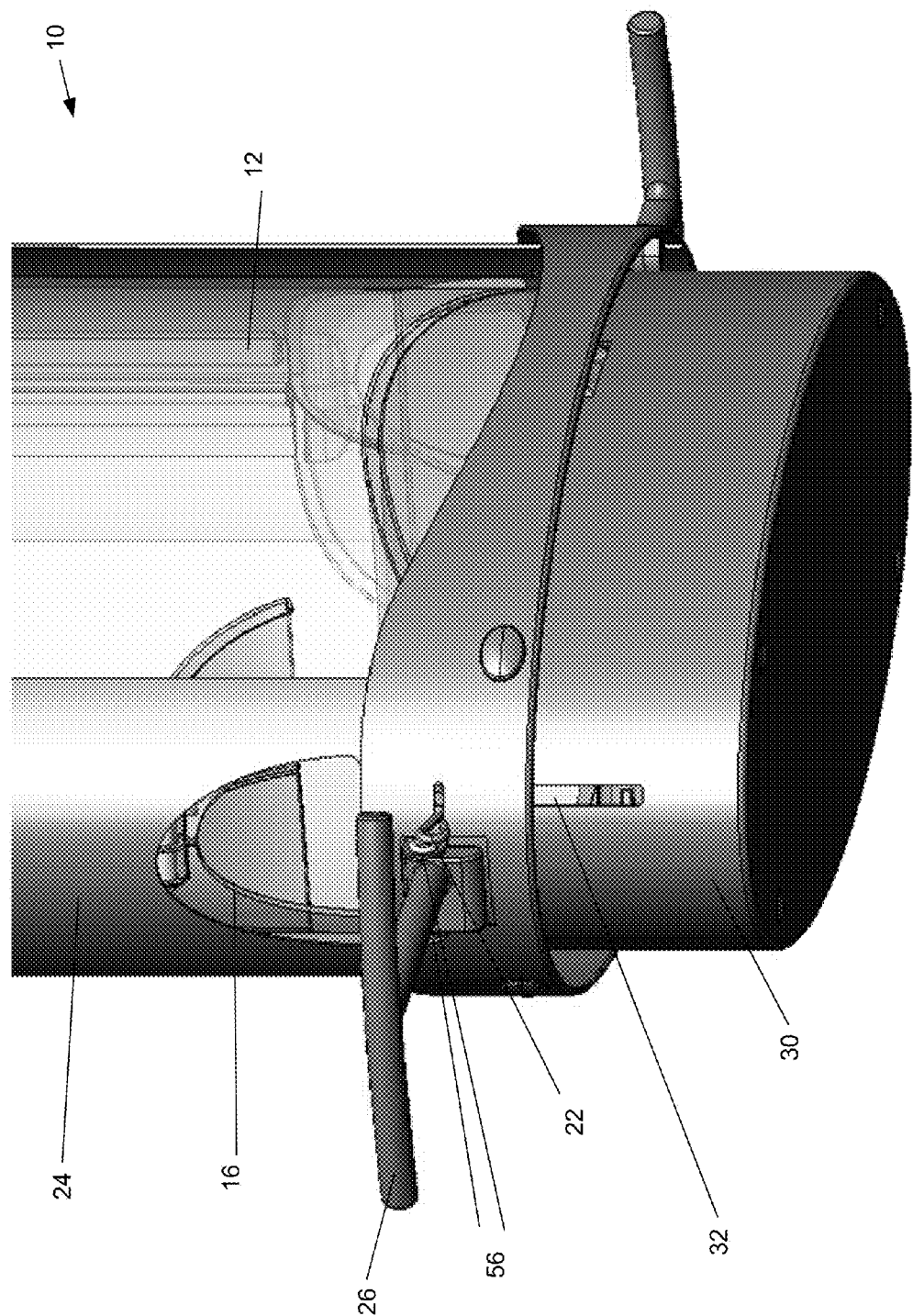
FIG. 3 is a partial close-up view of a moveable perch and an adjacent feed port.
Figure 5:
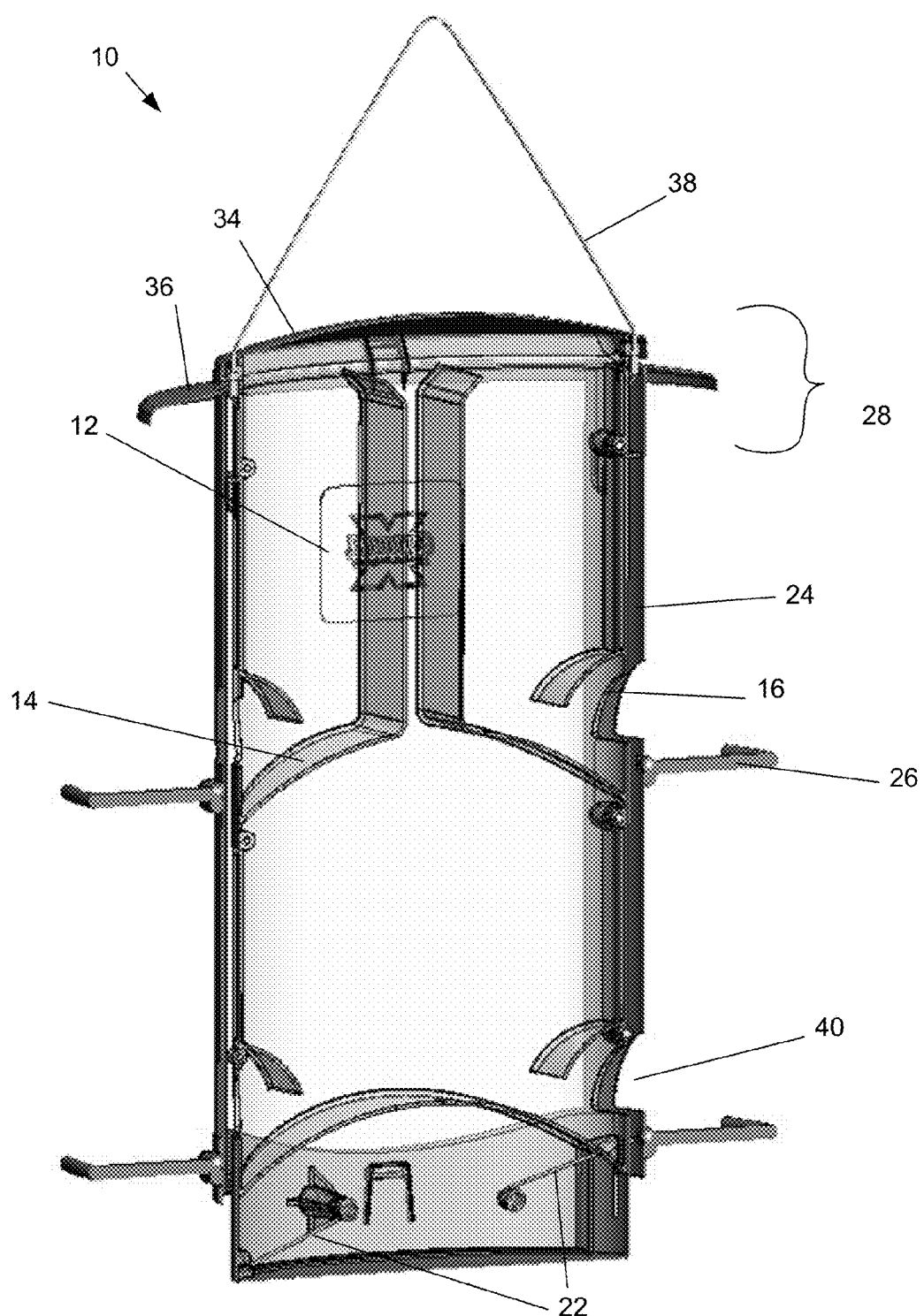
FIG. 5 is a vertical cross-section through the center of the embodiment of FIG. 1.

Referring to FIG. 3, a base 30, preferably of a stamped thin metal similar to the roof assembly 28 and actuator 24 portions as will be detailed, engages and surrounds this lower portion of the housing 12. As stated previously, this embodiment has four feeding ports 16. Accordingly, this embodiment includes a perch 26 adjacent to each of the feeding ports 16. The perch 26 preferably comprises a T-shaped metal protrusion attached to a sheet metal actuator 24 by a pair of lugs 56. This construction permits the perch 26 to hinge upwardly and fit snugly against the and parallel to the housing 10 for easy compact shipping. More importantly, however, each perch 26 is affixed to the actuator 24 which as will be detailed, is in turn mounted for movement relative to the housing 12. Referring again to FIG. 4, a torsion spring 22 as mentioned previously is mounted at one end to the housing 12 and around an integrally formed stud 20 within the bottom portion of the housing 12. As seen in FIGS. 4 and 5, the distal movable end of the torsion spring 22 engages preferably the lower-most end of the actuator 24. In this embodiment the torsion spring 22 passes through a slot 32 in the base 30 and serves to help guide the generally vertical movement of the perches 26 and actuators 24 (and at least a portion of the roof assembly 28 as will be detailed.)

Figure 6:
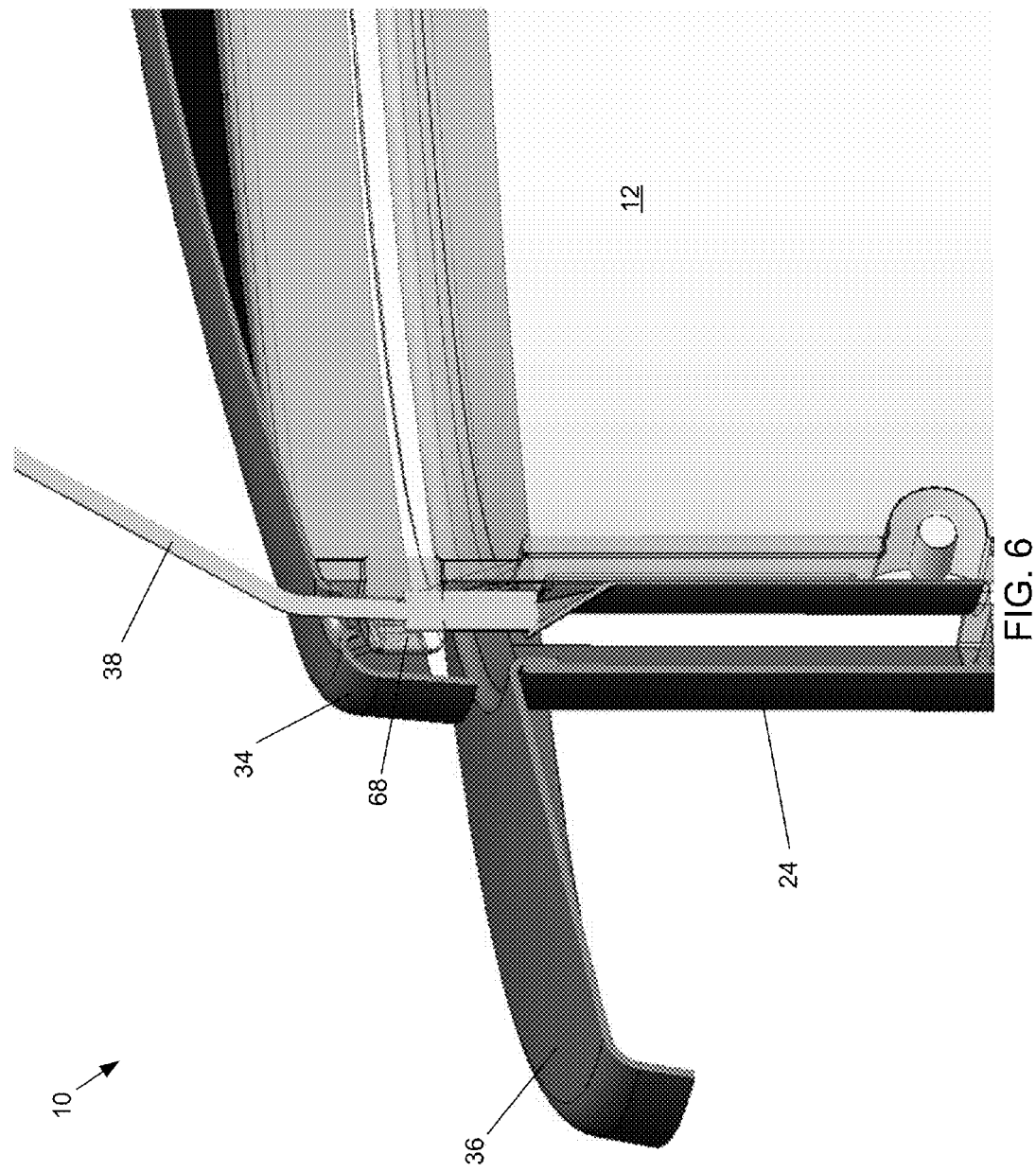
FIG. 6 is a close-up partial sectional view through an upper portion of the first embodiment showing the roof assembly, the hanger and the housing.

Referring to FIG. 6, the upper-most end of the actuator 24 is affixed, preferably by welding, to a portion of the roof assembly 28. In more detail, the roof assembly 28 comprises a lid portion 34 which is removably attached to and covers the upwardly facing opening into the feed reservoir of the housing 12. This portion is separate from but cooperates with a movable, radially-extending outward portion 36 of the roof assembly 28 which is affixed to the upper end of the actuators 24. These two portions of the roof assembly 28 (i.e., lid portion 34 and the movable portion 36) act to close the opening used to fill the seed reservoir and to help shield the feed reservoir and the feed ports 16 from precipitation. The second or movable portion 36 of the roof assembly 28 protrudes radially outwardly beyond the vertical wall of the housing 12 and, as previously discussed, is affixed to the upper end of the actuator 24.

Referring to various figures, a hanger 38, preferably comprising a flexible steel cable of about a $\frac{1}{16}^{th}$ inch diameter is affixed at each of its ends to a molded in plastic lug 68 at the upper-most edge of the housing 12.

The movable portion 36 of the roof assembly 28 is attached to and moves with the actuator 24 and thus moves against or with the bias of the torsion springs 22 as previously described. Note that the actuator 24 includes an aperture 40 which, in one position of the spring biased perch 26 is aligned with the feed port 16 through the housing 12 wall. If a non-bird species, such as a squirrel, attempts to access the birdseed in the feed when the feeder is hanging from the hanger 38, usually this requires the squirrel to grip either the roof 28 or one or more of the perches 26, since the housing 12 has almost no features which can be gripped by the squirrel. The weight of this non-bird species overpowers the spring bias of the torsion springs 22, causing the movable portion 36 of the roof assembly 28 and the actuator 24 and its attached perches 26 to move downwardly. This downward displacement moves the apertures 40 in the actuators 24 out of alignment with the feed ports 16, thus occluding or obscuring access to the feed ports 16.

Further referring to FIGS. 3 and 4, the movable end of the biasing spring 22 is loosely attached to the actuator 24 and slides in a slot 32 through a peripheral band 42 that extends and connects the lower-most end of each actuator 24 with its opposing actuators 24. The peripheral band 42 helps guide the actuator 24 in a substantially only vertical direction up and down so that the aperture 40 through the actuator 24 normally aligns laterally as well as vertically with the feed port 16 when a bird is sitting on the perch 26 or at least when any non-bird species such as a squirrel has not deflected the actuator 24 downwardly against the bias of the torsion spring 22.

In a similar manner, each actuator 24 is attached at diametrically opposite locations to the movable portion 36 of the roof assembly 28. In this way a non-bird species, such as a squirrel may attempt to access the birdseed by climbing down the hanger 38 and gripping the roof 28 portion at any location. Regardless of that location, all of the feed ports 16 become closed or occluded when the actuator 24 assembly slides downwardly, guided by and against the bias of one or more torsion springs 22.

Preferably, the overall assembly 10 includes two torsion springs 22, each mounted symmetrically opposite from one another and engaging the bottom-most edge of the adjacent actuator 24 on opposite sides of the housing 12, as seen in FIGS. 4 and 5.

Figure 7A:
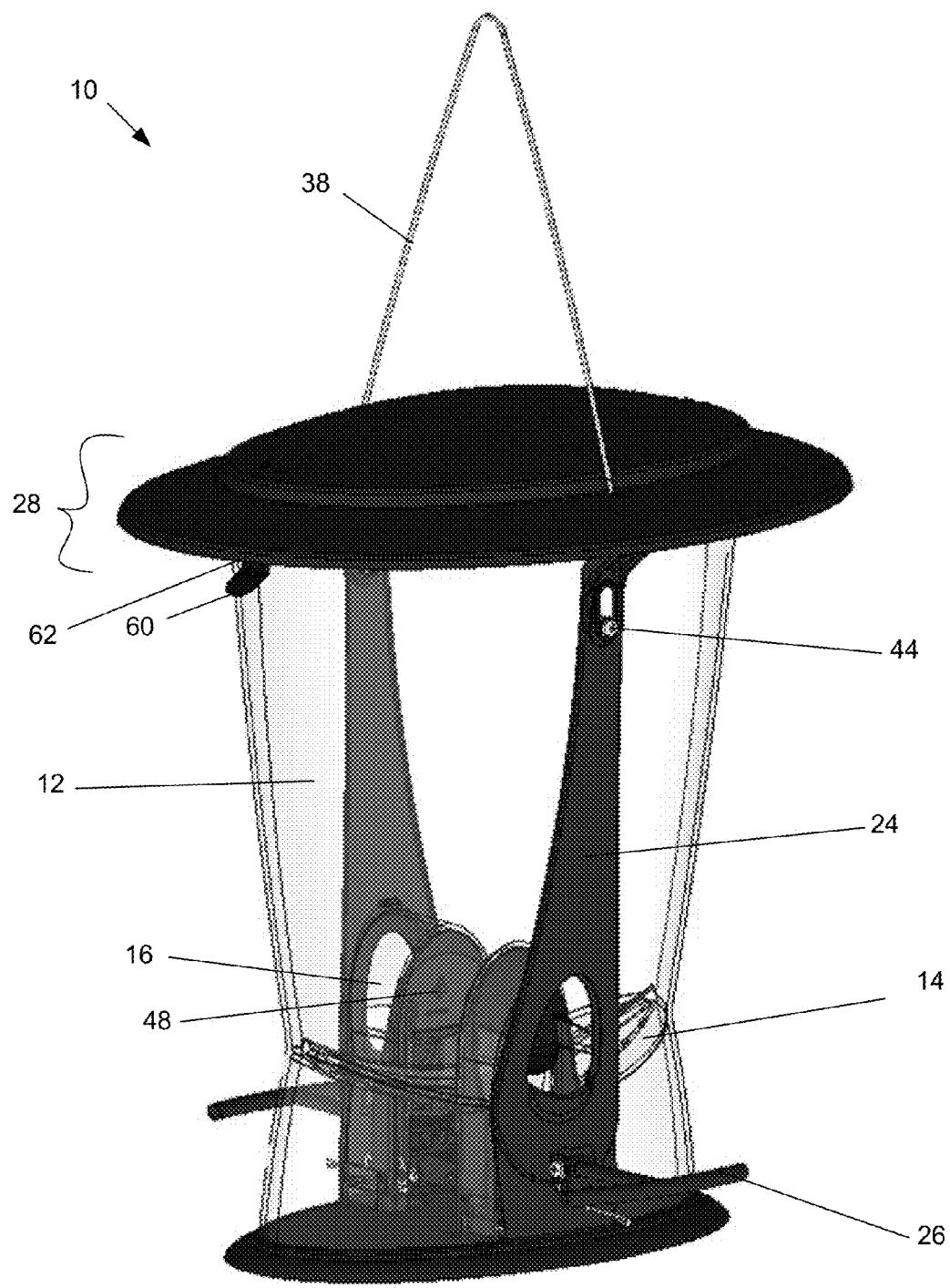
FIG. 7A is another embodiment shown in perspective.
Figure 7B:
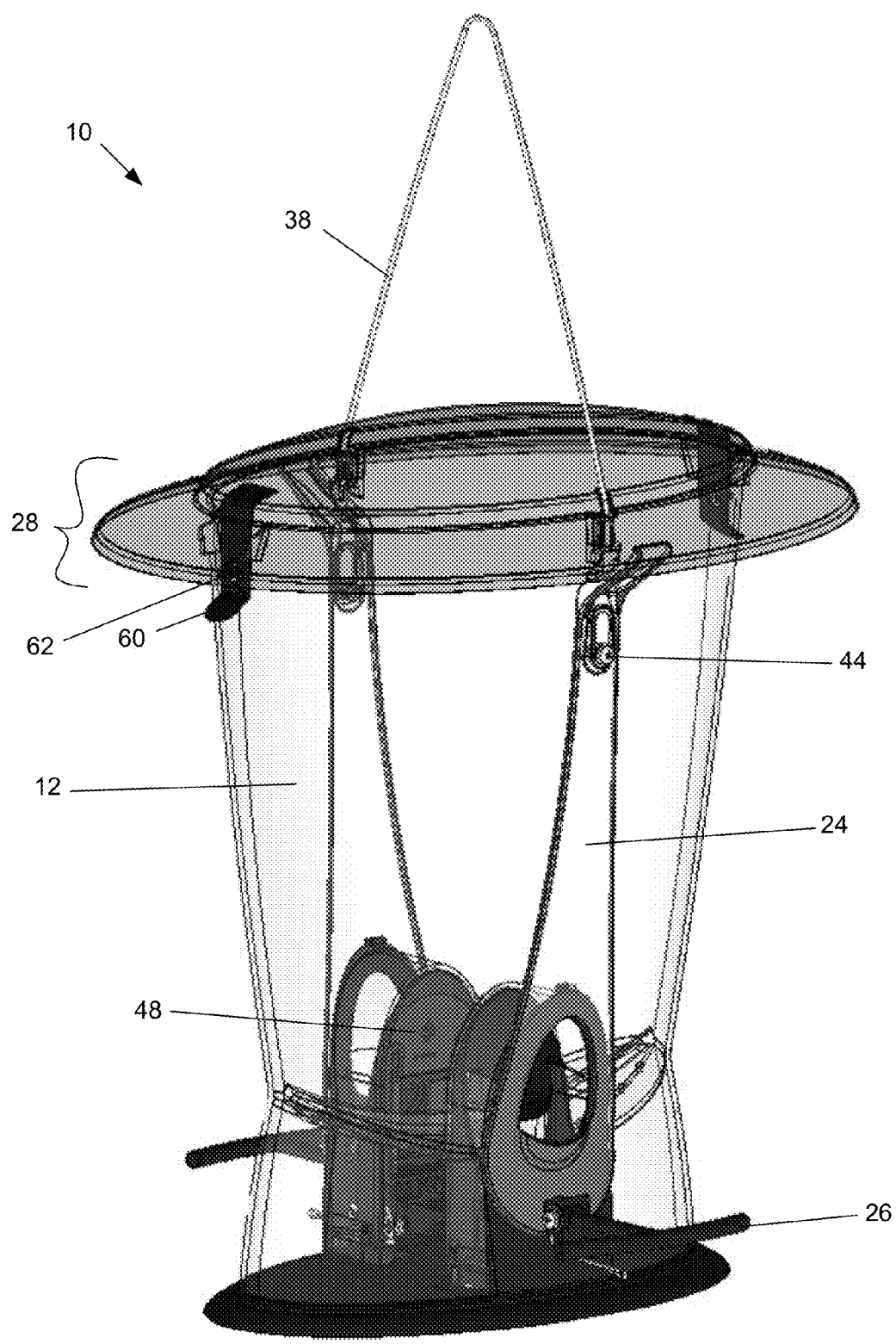
FIG. 7B is very similar to FIG. 7A with the roof assembly and actuators depicted transparently.
Figure 8:
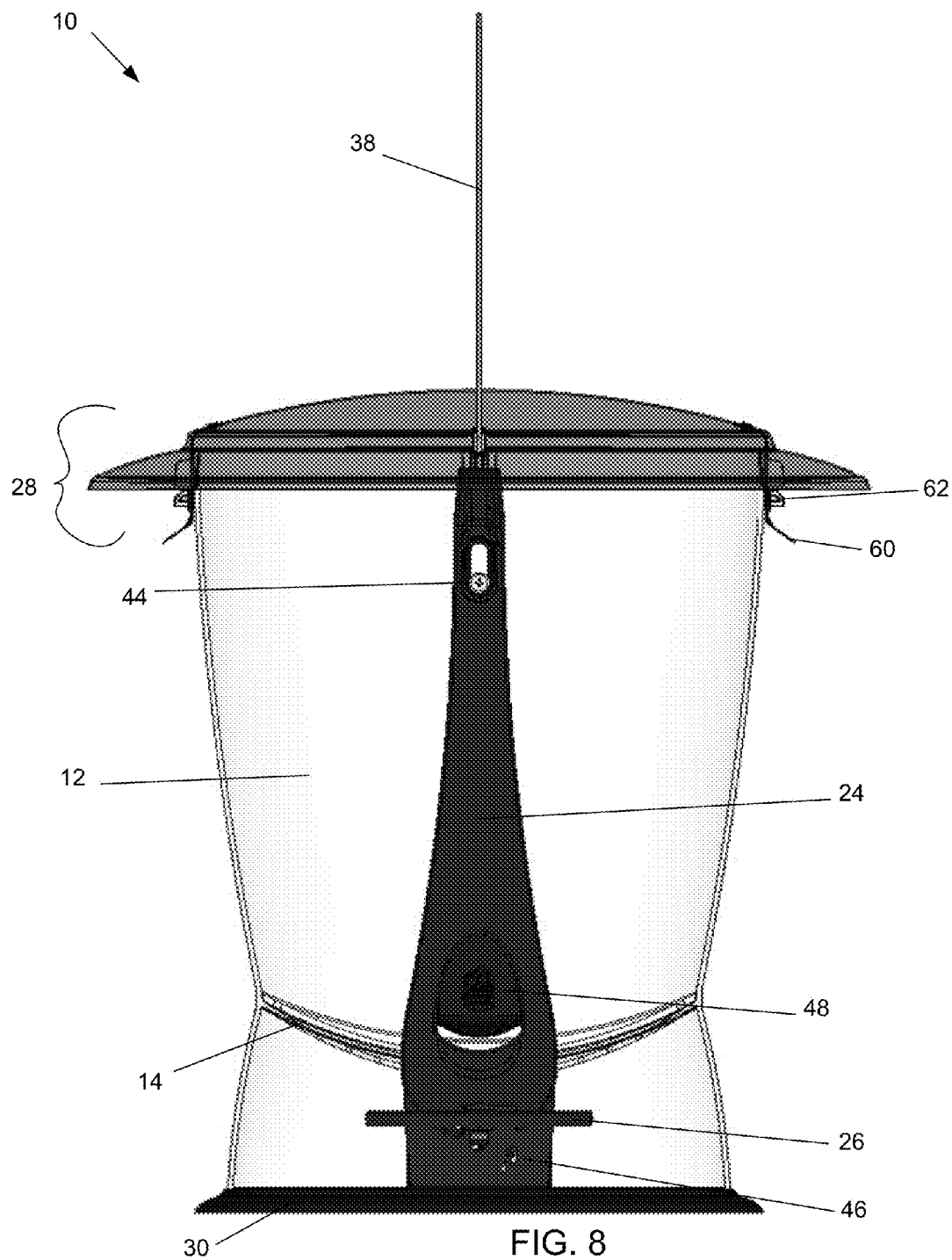
FIG. 8 is a plan view of the embodiment shown in FIG. 7 with a transparent roof assembly.
Figure 9:
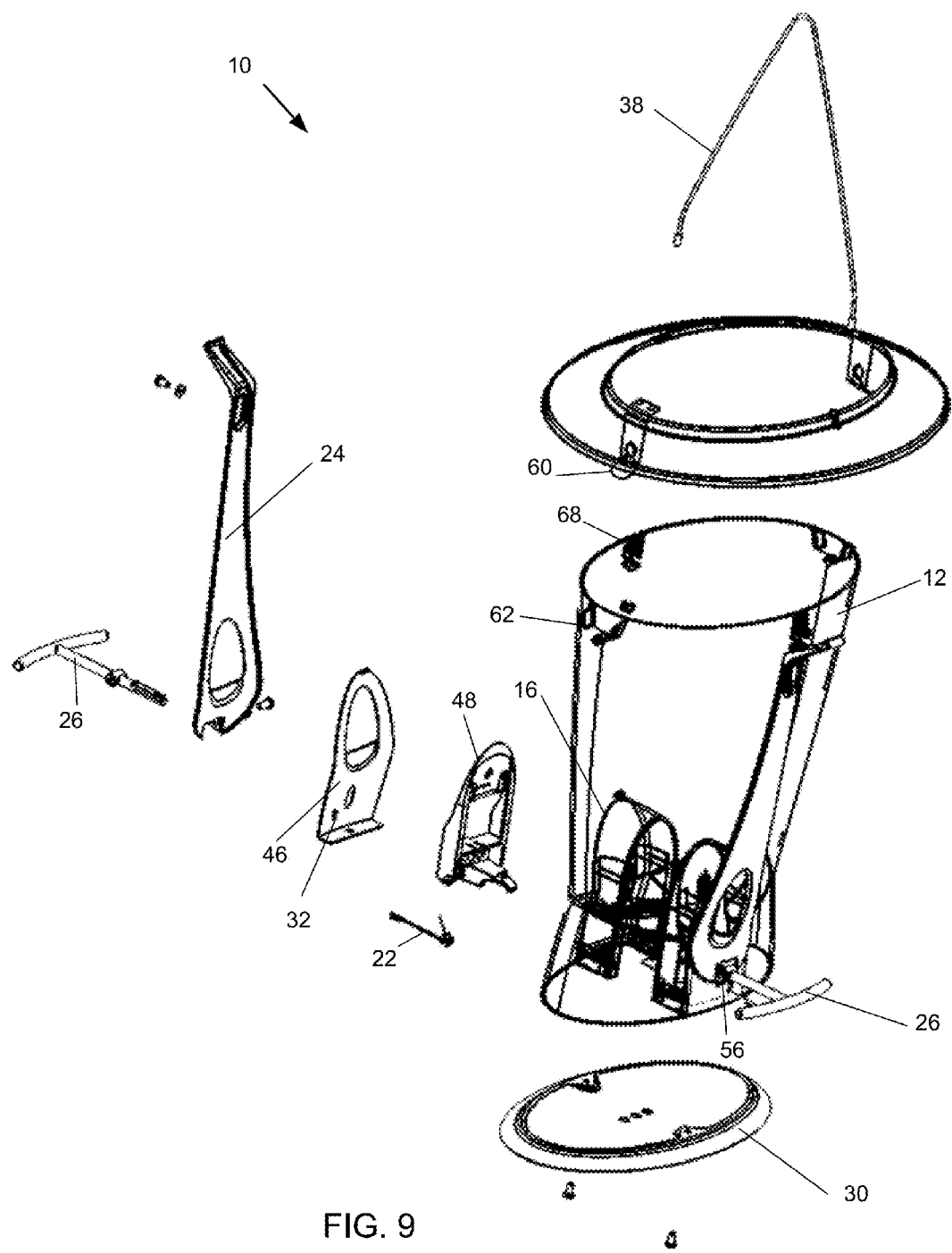
FIG. 9 is an exploded view of the main parts of the embodiment of FIG. 7A.
Figure 10:
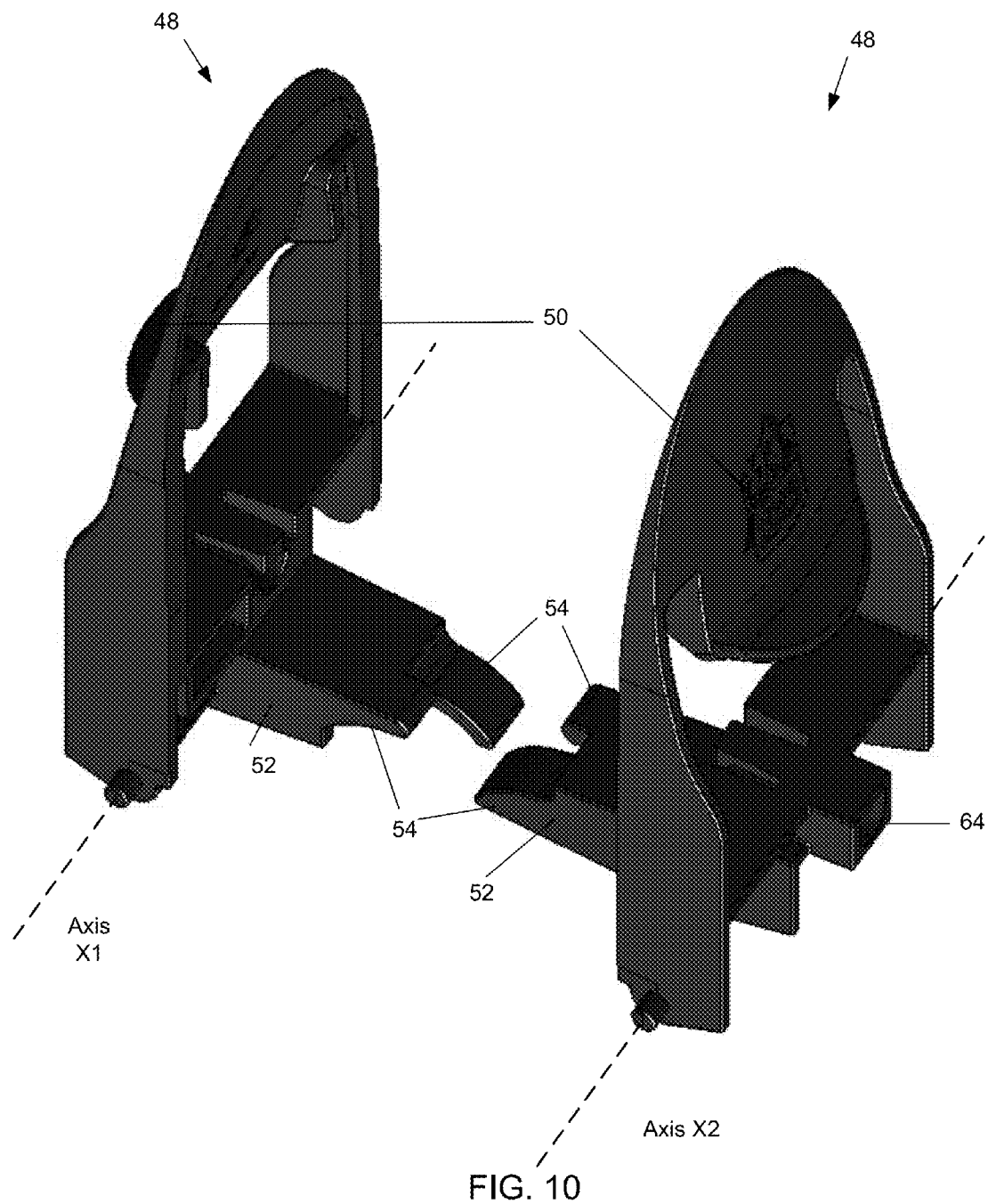
FIG. 10 shows a pair of port shutters with their inter-engagable linkages separated for clarity.
Figure 11:
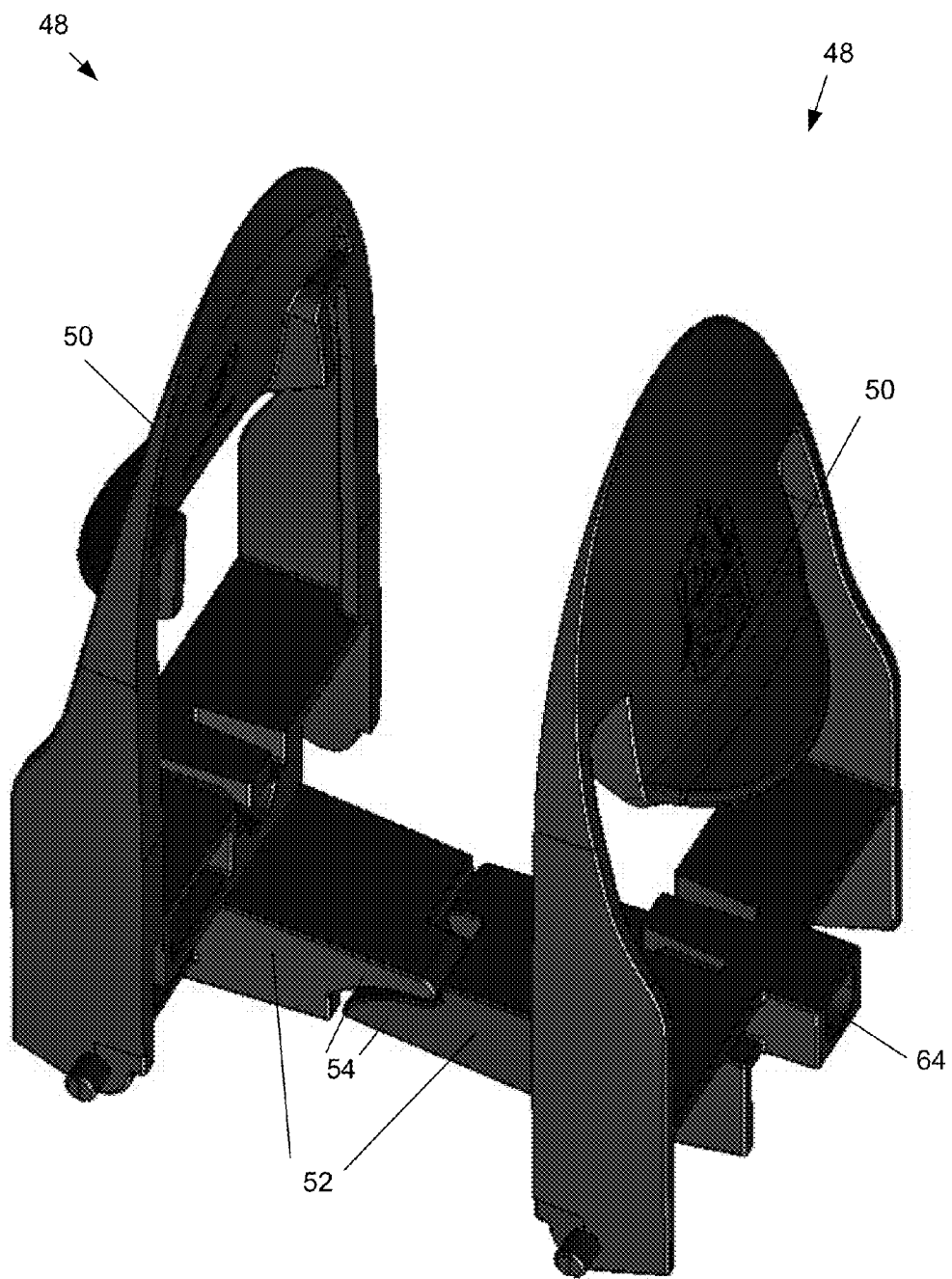
FIG. 11 shows a pair of port shutters with their linkages inter-engaged.
Figure 12:
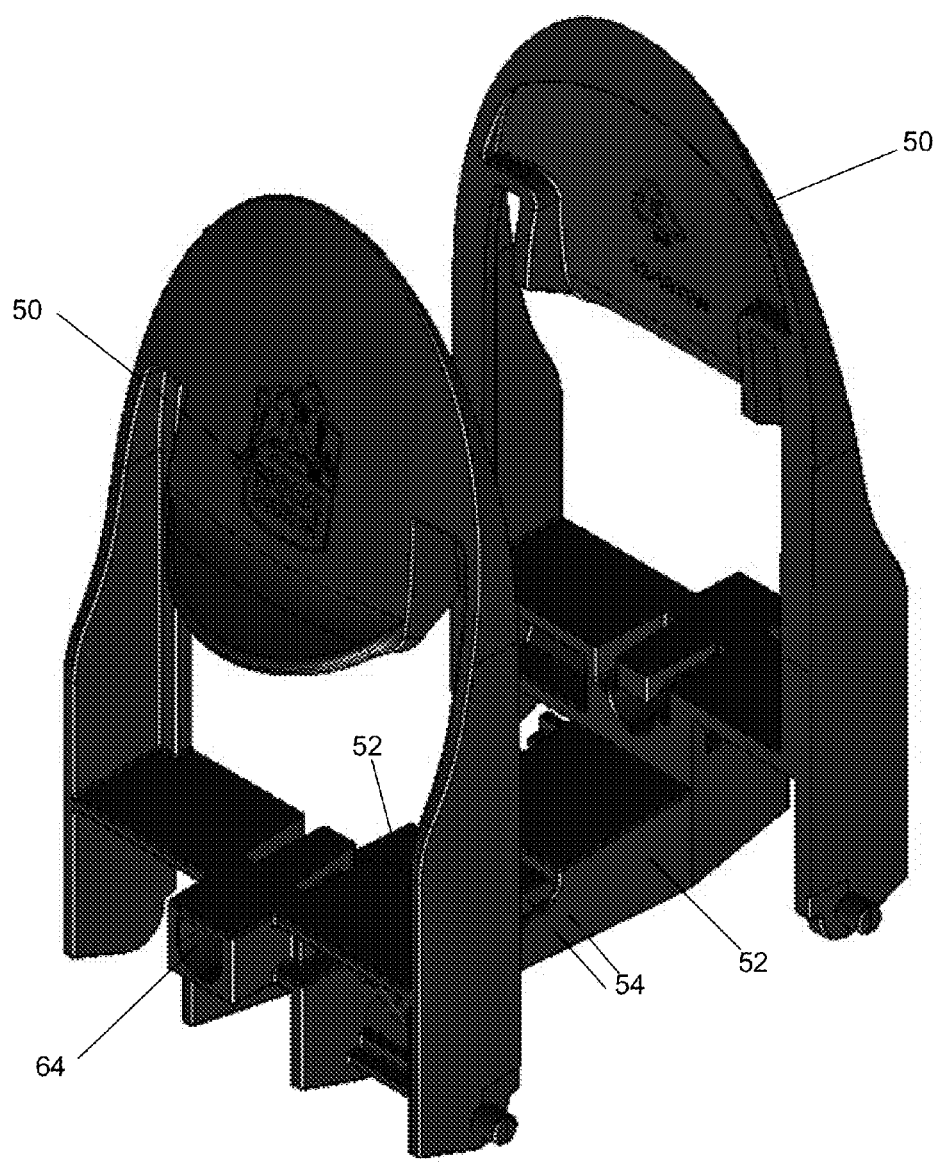
FIG. 12 is another view of the port shutters of FIG. 11.

Referring to FIGS. 7A and 7B, as well as subsequent figures, this embodiment also uses a pair of actuators 24 or linkages, but these actuators 24 normally bear upwardly on the downwardly-facing surface of a one-piece roof assembly 28. Each actuator 24 is mounted and guided by a screw 44 attached to a stud in the side of the housing 12 wall. The actuator 24 is capable of displacing a sliding distance 74, relative to the screw 44 location. The lower-most end of each actuator 24 includes a lug 56 to which is pivotally mounted a moveable perch 26 as previously described, the actuator 24 also has an aperture 40 which when the assembly is not being attached by a non-bird species aligns with and permits access to a feeding port 16 through the side of the housing 12. A torsion spring 22 mounted within the base 30 portion of the housing 12 engages the housing 12 in a mounting plate 46 at one end and the moveable end engages an inner surface of one of a pair of port shutters 48. The pair of port shutters 48 is shown separately in FIGS. 10-12. These consist of an upper broad portion 50 sized to occlude access through the feeding port 16 when moved towards the port 16 from the inside. Each of these shutters swing from a position spaced from the seed port 16 to a position adjacent to and against the inner surface of the feed port 16 when a non-bird species hangs from or engages the roof assembly 28 or any one of the perches 26 as will be detailed.

Figure 13:
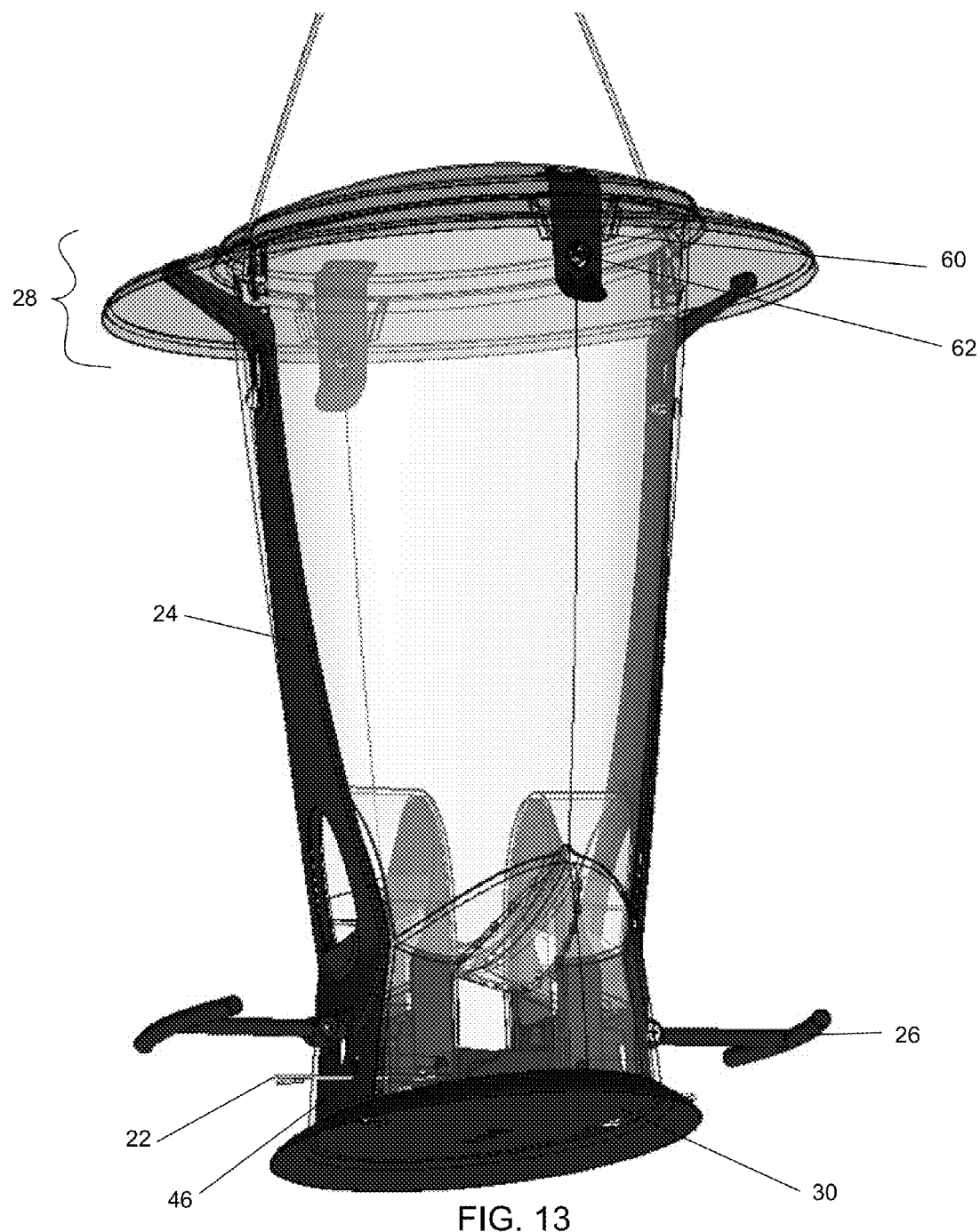
FIG. 13 shows the link extending from the perch to engage the underside of the roof assembly.
Figure 14:
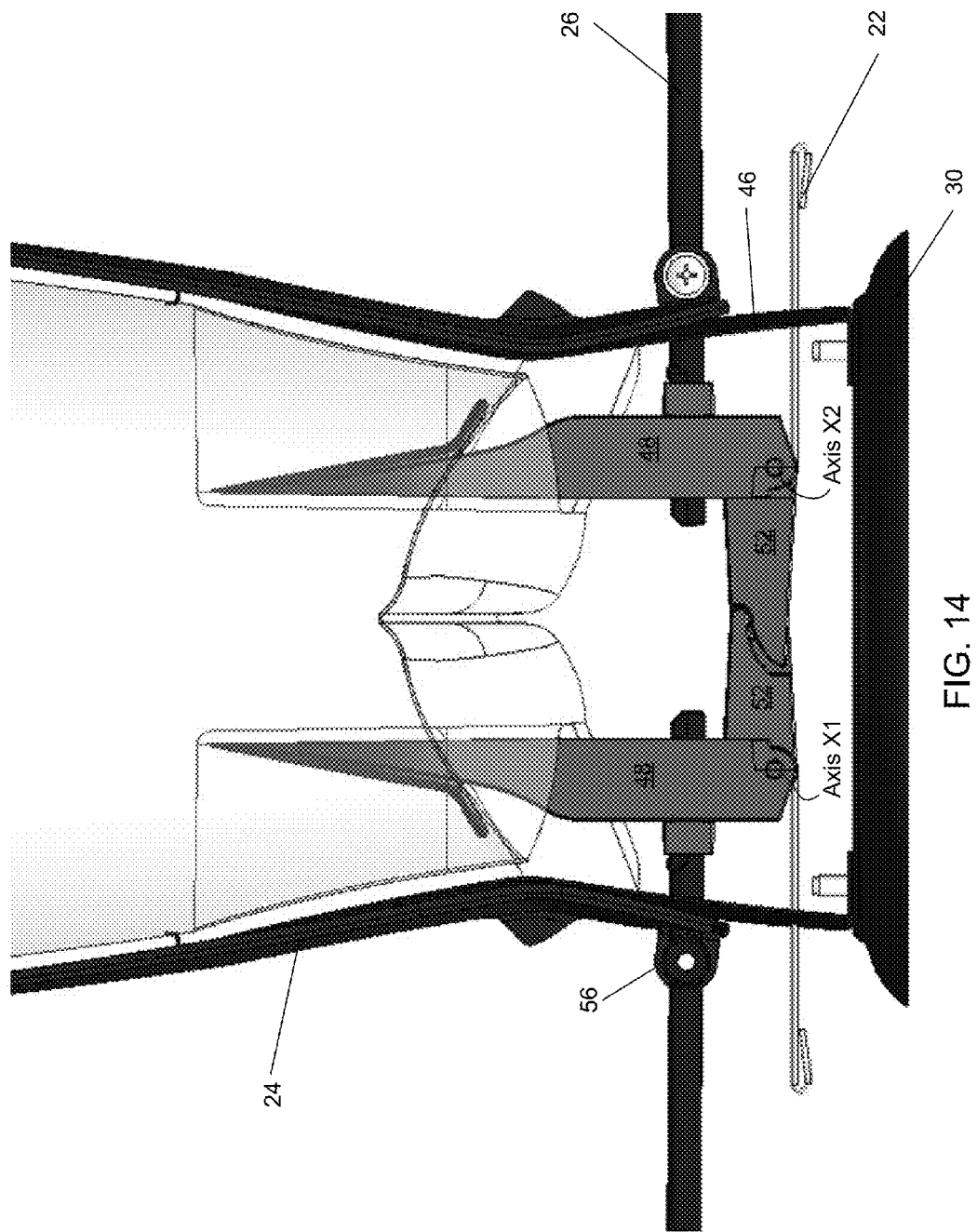
FIG. 14 is a partial cross-sectional view of a pair of movable perch assemblies.
Figure 16:
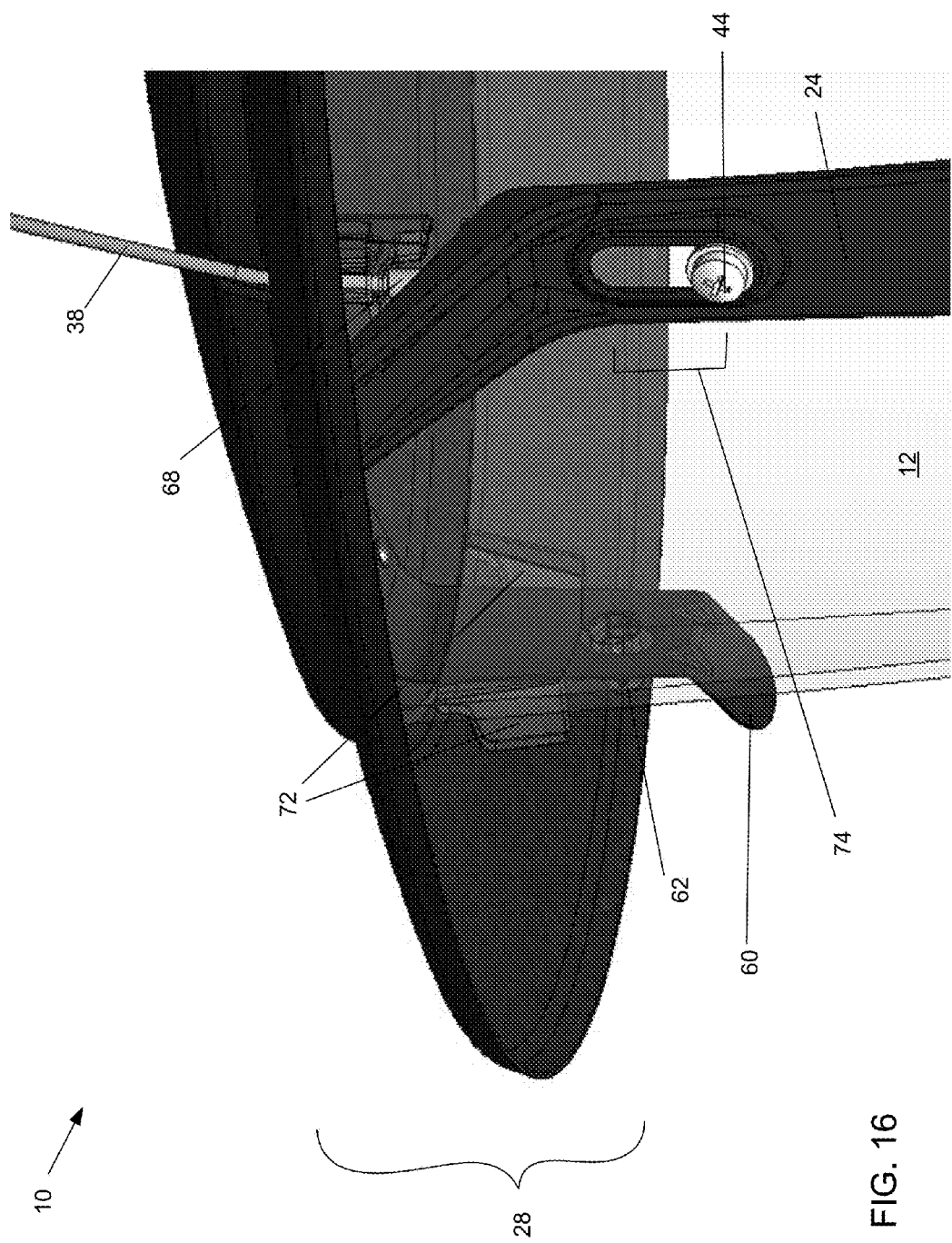
FIG. 16 is a close up of the link between the perch and the underside of the roof, as well as a latch and latch stud.

FIG. 14 shows a pair of perches 26 assembled to and engaging a pair of port shutters 48. Note that each of these paired perches 26 and shutters 48 pivot about axis x1 and x2 respectively. Each of the shutters 48 includes an extension arm 52 with a pair inter-engaging camming surfaces 54 such that if one of the shutters 48 moves towards the feed port 16 to occlude that feed port 16, the other shutter 48 will also move in this similar pivotal manner about its associated pivoting axis. The movement of the perch 26 is transmitted to the roof 28 or the movement of the roof 28 is transmitted to the perches 26 and thus the port shutters 48 via a lug and screw interconnections 56 as shown in FIGS. 13, 14, and 16, among others.

Figure 15:
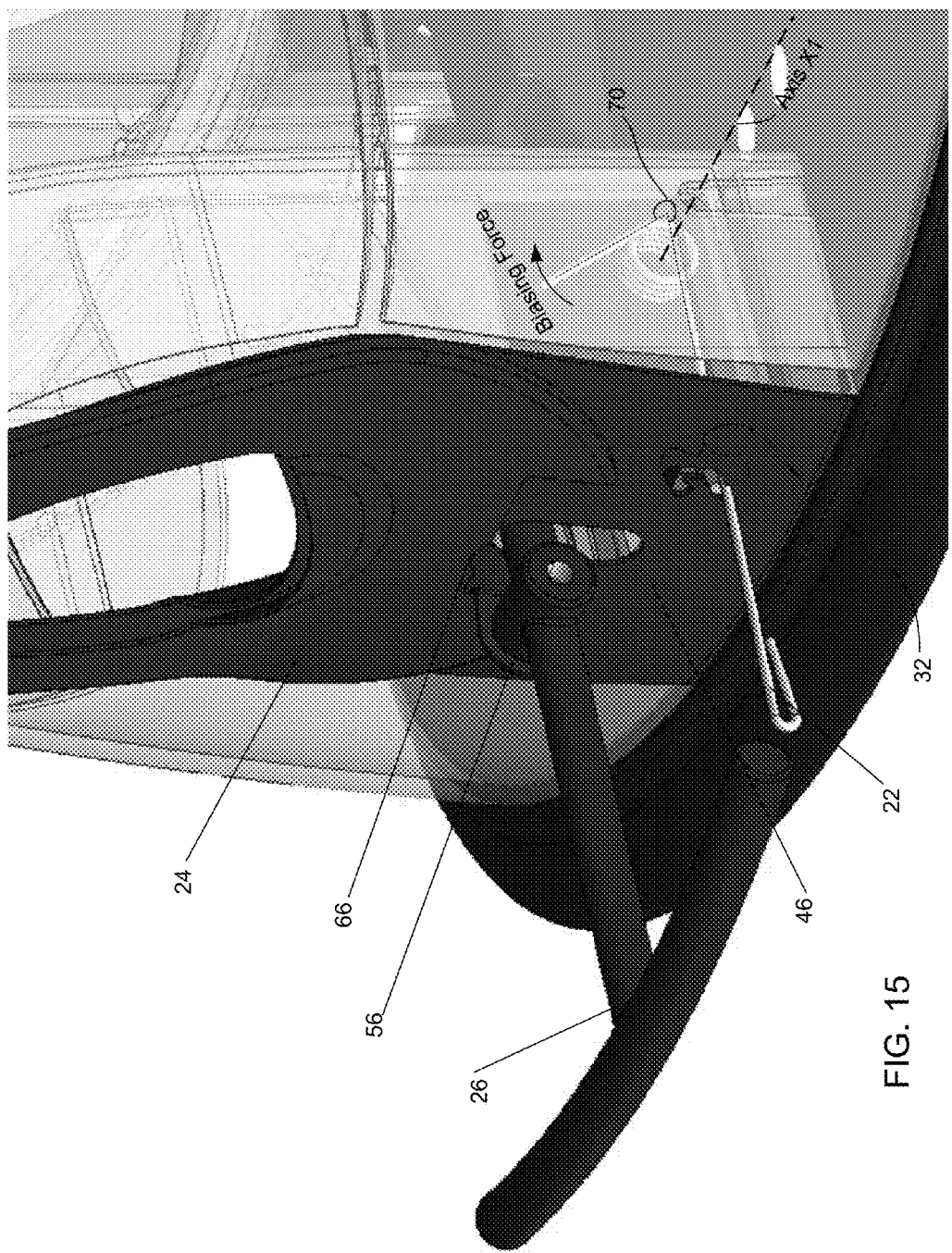
FIG. 15 shows the embodiment of FIG. 7A with a hidden port shutter in order to view a torsion spring adjustably engaging the housing.

FIG. 15 generally shows a close-up of the lower portion of the assembly 10 with the port shutter 48 hidden in order to view the torsion spring 22. The spring bias provided by the pair of torsion springs 22 can be adjusted by moving the otherwise fixed end of the torsion spring 22 into one of two or many slots 32 formed in the bottom portion of the port shield 58 which is attached in turn to the adjacent portion of the housing 12 wall. The slots 32 in the mounting plate 46 are shown such that placement of the torsion spring 22 in differing slots 32 either increases or decreases the biasing force associated with the spring 22. The change in biasing force results in different forces necessary to displace the perch 26 and thus occlude the feed in the port 16. The reason for the variable bias force is that a change in displacement angle 70 between the moving end of the torsion spring (i.e., the end that is housed in the port shutter 48) and the static end (i.e., the end that is in the slot 32) causes a change in the force necessary to oppose such a force. In such a way, a smaller displacement angle 70 between ends of the torsion spring 22 equates to a higher biasing force necessary to displace the perch 26. As an example, to increase the force necessary to displace the perch 26 (i.e., to allow for heavier birds to feed), the torsion spring 22 is placed in a slot 32 that increases the bias force. In this example, the bias force will be the largest in the highest or topmost slot 32. On the other hand, in order to minimize the force necessary to displace the perch 26, the torsion spring 22 is placed in a slot 32 that decreases the bias force. In this example, the bias force will be the least in the lowest slot 32.

Although the embodiment of FIG. 7A includes two slots 32 for altering the biasing force associated with lowering the perch 26 and thus occluding access to the feed, the assembly 10 can includes any suitable number of slots 32. As an example, the embodiment of FIG. 1 and/or FIG. 7A may include three or four slots 32 for the altering of the biasing force. Whereas the embodiment of FIG. 1 includes a single slot 32, it is contemplated that such an embodiment may include additional slots 32, as similarly depicted with respect to the embodiment in FIG. 7A.

FIG. 15 further illustrates the interaction between the actuator 24, the mounting plate 46, and the perch 26. The actuator 24 couples to the perch 26 at a lug and screw 56 as described previously. As a force is applied to either a portion of the roof assembly 28 or to the perch 26, the actuator 24 displaces downwardly relative to the mounting plate 46. The low end of the actuator 24 also includes a notch 66 that accommodates certain movements from the perch 26 when the actuator 24 is in a downward displacement.

Referring to FIG. 16, the roof 28 is attached to the housing 12 by a latch 60 and a latch stud 62. In addition, the screw 44 and stud are visible, wherein a downward force on the roof assembly 28 will engage with a top end of the actuator 24 and cause the actuator to displace downwardly relative to the screw 44 and stud, which is coupled to the housing 12. It is evident from this illustration that the amount of downward displacement of the actuator is determined by the allowable sliding distance 74 of the actuator 24 relative to the screw 44.

The roof assembly 28 toggles or rotates about the latch stud 62, as seen in FIG. 16. The rotation or toggling of the roof 28 is guided or otherwise restrained by guides 72 on either side of the latch 60. The amount of rotation of the roof 28 effects the downward displacement of the roof 28. The displacement of the roof can be controlled by appropriate placement of the guides 72 relative to the latch 60 and latch stud 62. In such a way, the position and angle of the guides 72 will correlate to the sliding distance 74 of the screw 44 so that the downward displacement of the roof 28 generally corresponds with the downward displacement of the actuator 24.

Referring to FIG. 16, the hanger 38 extends through an aperture in the roof 28 and is affixed at each of its ends to a molded plastic lug 68 at the upper most edge of the housing 12, as described previously.

Figure 17:
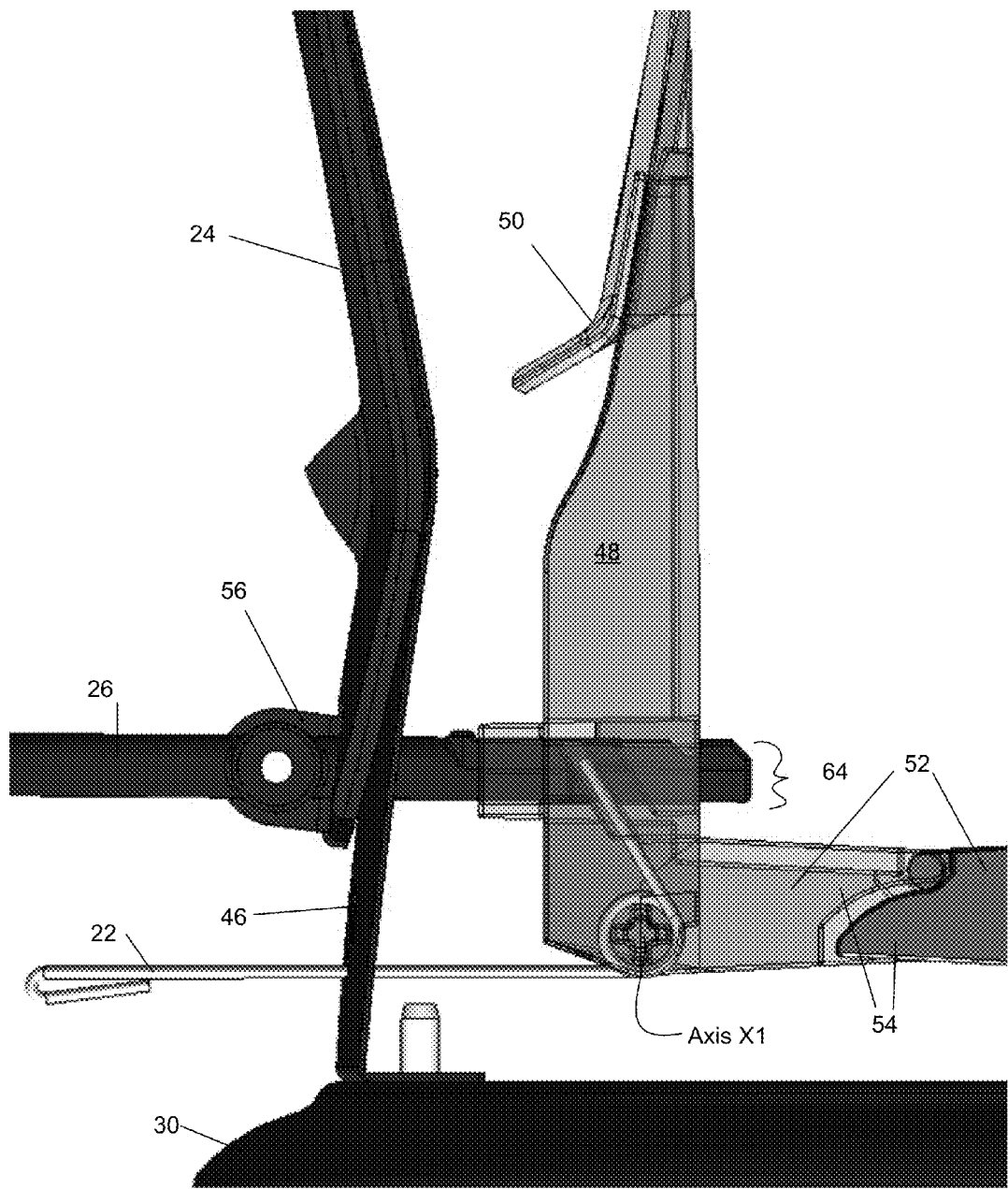
FIG. 17 is a side view of the embodiment of FIG. 7A, wherein a port shutter is depicted transparently.

FIG. 17 depicts the assembly 10 with a transparent port shutter 48 in order to clearly display the torsion spring 22 and the inner structure of the shutter 48. The moving end of the torsion spring 22 is mounted within the port shutter 48 such that rotation of the shutter 48 about axis x1 towards the port 16 decreases the displacement angle 70 for so long as a force is applied. As the force is decreased, on either the perch 26 or a portion of the roof assembly 28, the shutter 48 rotates about axis x1 back towards the center of the housing 12, which correspondingly increases the displacement angle 70. Further referring to FIG. 17, the perch 26 is received in the receiving slot 64 of the port shutter 64. The receiving slot 64 includes a latch mechanism on the upper side of the shutter 48 that engages with the shaft of the perch 26.

In operation, this bird feeder 10 example functions as follows: The user releases the roof from the housing 12 by deflecting the latches 60 outwardly from over the latch studs 62, and slides the roof upwardly along a portion of the hanger 38 cable. This exposes the upwardly facing opening into the seed reservoir formed by the walls of the housing 12. Once the housing 12 is filled with birdseed to form a reservoir of the seed, the interior adjacent the feed ports 16 become filled with seed. The user latches the roof onto the latch studs 62. The seed filters down through the housing 12 and is distributed to in this case two seed ports 16. Birds having a normal weight can rest on the perch 26 and feed via the feed ports 16. The actuators 24 remain relatively unmoving, being held in an upward position by the bias of the one or preferably two torsion springs 22. Should a non-bird species, such as a squirrel, try to feed from the seed ports 16, the spring bias of the torsion springs 22 is overcome, thus moving the perch 26 downwardly, which in turn drags the actuator 24 down as well as moves both of the port shutters 48 downwardly and forwardly to occlude the seed ports 16. Similarly, if a non-bird species such as a squirrel tries to access the seed ports 16 by gripping and hanging from the roof, the roof pivots about the latch studs, pressing on the adjacent actuator 24. The actuator 24 in turn moves the perch 26 immediately below that side of the housing 12, and the port shutter closes. Since both port shutters 48 are linked together with the cam surfaces 54 as previously discussed, the other port 16 is closed by the shutter as well, thus defeating any chance that a squirrel or other non-bird species could easily access the supply of seed in the housing 12.

Various modifications and additions can be made to the exemplary embodiments discussed without departing from the spirit and scope of the presently disclosed technology. For example, while the embodiments described above refer to particular features, the scope of this disclosure also includes embodiments having different combinations of features and embodiments that do not include all of the described features. Accordingly, the scope of the presently disclosed technology is intended to embrace all such alternatives, modifications, and variations together with all equivalents thereof.

What is claimed is:

1. A feeder for dispensing a supply of bird feed to wild birds, but resisting dispensing the bird feed to a non-bird, the feeder comprising:
 a housing having a generally vertically extending wall defining a feed reservoir for the supply of bird feed to be dispensed and an upwardly facing opening to the feed reservoir, the wall having a plurality of feed ports formed through the wall;
 a roof assembly removably covering the upwardly facing opening and mounted for movement relative to the housing, the roof assembly including at least one opening sized to permit a hanger to pass through, the hanger attaching to the housing for suspending the feeder from a support;
 a plurality of perches, each of the perches disposed adjacent to an adjacent port of the feed ports and being mounted for movement relative to the adjacent port, movement of the perches and movement of the roof assembly relative to the housing being permitted when the housing is suspended by the hanger;
 at least one spring for biasing each of the perches into a first position relative to the adjacent port, the at least one spring permitting each of the perches to move to a second position when the non-bird moves either the roof assembly or at least one of the perches downwardly against the bias of the at least one spring; and
 a mechanical link attached to each of the perches and extending generally vertically from the perches to and linking a portion of the roof assembly that extends outwardly from and beyond the wall, whereby movement of the roof assembly relative to the housing causes each of the perches to move relative to the adjacent port.

2. A feeder for dispensing a supply of bird feed to wild birds but resisting dispensing the bird feed to a non-bird, the feeder comprising:
 a housing having a generally vertically extending wall defining a feed reservoir for the supply of bird feed to be dispensed and an upwardly facing opening to the feed reservoir, the wall having a plurality of feed ports formed through the wall;
 a roof assembly removably covering the upwardly facing opening and mounted for movement relative to the housing, the roof assembly including at least one opening sized to permit a hanger to pass through, the hanger attaching to the housing for suspending the feeder from a support;
 a plurality of perches, each of the perches disposed adjacent to an adjacent port of the feed ports and being mounted for movement relative to the adjacent port, movement of the perches and movement of the roof assembly relative to the housing being permitted when the housing is suspended by the hanger;
 at least one spring for biasing each of the perches into a first position relative to the adjacent port, the at least one spring permitting each of the perches to move to a second position when the non-bird moves either the roof assembly or at least one of the perches downwardly against the bias of the at least one spring; and
 a mechanical link attached to each of the perches and extending generally vertically from the perches upwardly to a portion of the roof assembly that extends outwardly from and beyond the wall, whereby movement of the roof assembly relative to the housing causes each of the perches to move relative to the adjacent port.

3. The feeder of claim 2, wherein the mechanical link has a plurality of apertures, each aperture aligned with one of the feed ports.

4. The feeder of claim 2, wherein a biasing force of the at least one spring is adjustable.

5. The feeder of claim 4, wherein the at least one spring includes a reference end and a moving end, and the biasing force is adjustable by changing a displacement angle defined between the reference end and the moveable end of the at least one spring.

6. The feeder of claim 5, wherein moving the reference end of the at least one spring into a plurality of slots changes the displacement angle.

7. The feeder of claim 2, wherein a biasing force of each of the at least one spring is separately adjustable.

8. The feeder of claim 2, wherein movement of one of the perches relative to the adjacent port causes movement of all of the perches relative to the feed ports.

9. The feeder of claim 2, wherein the perches are mechanically linked by a camming device, such that movement from one of the perches is transmitted through the camming device to another of the perches.

10. The feeder of claim 9, wherein opposing perches include reciprocating halves of the camming device.

11. The feeder of claim 2, wherein a plurality of apertures in the mechanical link are aligned with the feed ports when the perches are in the first position, and when the perches are in the second position, the feed ports are occluded.

12. The feeder of claim 2, wherein movement of one of the perches relative to the adjacent port causes the roof assembly to move relative to the housing.

13. The feeder of claim 12, wherein the movement of the roof assembly is downward displacement of the portion of the roof assembly that extends outwardly from and beyond the wall.

14. The feeder of claim 13, wherein the downward displacement of the roof assembly is a result of the roof assembly pivoting about an orthogonal axis to an axis defined through the feed ports.

15. The feeder of claim 12, wherein the movement of the roof assembly includes a pivoting movement relative to the housing.

16. The feeder of claim 2, wherein the mechanical link includes a pair of actuators extending along the wall to the portion of the roof assembly that extends outwardly from and beyond the wall.

17. The feeder of claim 2, wherein the roof assembly includes a lid portion for removably covering the upwardly facing opening and a movable portion including the portion of the roof assembly that extends outwardly from and beyond the wall.

18. The feeder of claim 17, wherein a translational movement of the movable portion causes all of the perches to move to the second position and occlude all of the feed ports.

19. The feeder of claim 2, wherein the roof assembly includes a lid for removably covering the upwardly facing opening, the lid including the portion of the roof assembly that extends outwardly from and beyond the wall.

20. The feeder of claim 2, wherein the feed ports are accessible when the perches are in the first position and the feed ports are at least partially occluded when the perches are in the second position.

* * * * *